US009127618B2

(12) United States Patent
Azevedo et al.

(10) Patent No.: US 9,127,618 B2
(45) Date of Patent: Sep. 8, 2015

(54) REDUCED COMPRESSION HEIGHT PISTON AND PISTON ASSEMBLY THEREWITH AND METHODS OF CONSTRUCTION THEREOF

(71) Applicant: Federal-Mogul Corporation, Southfield, MI (US)

(72) Inventors: Miguel Azevedo, Ann Arbor, MI (US); Michael Weinenger, Southfield, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/040,259

(22) Filed: Sep. 27, 2013

(65) Prior Publication Data

US 2014/0083390 A1    Mar. 27, 2014

Related U.S. Application Data

(60) Provisional application No. 61/706,621, filed on Sep. 27, 2012, provisional application No. 61/794,216, filed on Mar. 15, 2013.

(51) Int. Cl.
*F02F 3/00* (2006.01)
*F02F 3/16* (2006.01)
(Continued)

(52) U.S. Cl.
CPC ...  *F02F 3/16* (2013.01); *F02F 3/00* (2013.01); *F16J 1/005* (2013.01); *F16J 1/09* (2013.01); *F16J 1/16* (2013.01); *F16J 7/00* (2013.01); *Y10T 29/49249* (2015.01)

(58) Field of Classification Search
CPC .................. F02F 3/22; F02F 3/00; F02F 3/16; F01M 1/06
USPC ........ 123/193.1, 193.3, 193.4, 193.66, 41.16, 123/41.33, 41.35; 92/69 A, 109, 110.111, 92/112, 117 A, 119, 158, 172, 186; 29/888.044, 888.042, 888.047
See application file for complete search history.

(56) References Cited

U.S. PATENT DOCUMENTS 2,386,117  A    12/1943  Hvid
2,369,500  A     2/1945  Waeber
(Continued)

FOREIGN PATENT DOCUMENTS

DE    1010322 B    6/1957
DE    3511835      10/1986
(Continued)

OTHER PUBLICATIONS

International Search Report mailed Mar. 31, 2014 (PCT/US2013/062223).

*Primary Examiner* — Lindsay Low
*Assistant Examiner* — Long T Tran
(74) *Attorney, Agent, or Firm* — Robert L. Stearns; Dickinson Wright, PLLC

(57) ABSTRACT

A piston assembly and method of construction thereof for an internal combustion engine are provided. The assembly includes a piston head having an upper combustion wall with an undercrown surface and a ring belt region. The piston head has a floor with an upper surface and a bottom surface. The floor is spaced beneath the upper combustion wall in radial alignment with the ring belt region. A substantially enclosed, annular cooling gallery is bounded by the undercrown surface and the floor. A pair of pin bores depends directly from the floor of the cooling gallery. The assembly further includes a pin having ends configured for oscillating receipt in the pin bores. A pin bearing surface extends within the pin bores and between the pin bores in the lower surface of the floor. The assembly includes a connecting rod with an end fixed to the pin for conjoint oscillation therewith.

22 Claims, 19 Drawing Sheets

(51) Int. Cl.
*F16J 1/16* (2006.01)
*F16J 1/00* (2006.01)
*F16J 1/09* (2006.01)
*F16J 7/00* (2006.01)

(56) References Cited

U.S. PATENT DOCUMENTS

| | | | |
|---|---|---|---|
| 2,372,050 | A | 3/1945 | Barraja-Frauenfelder |
| 2,742,883 | A | 4/1956 | Smith |
| 2,819,936 | A | 1/1958 | Cambeis |
| 2,823,085 | A | 2/1958 | Keylwert |
| 3,240,193 | A | 3/1966 | Ephraim, Jr. |
| 3,545,341 | A | 12/1970 | Fischer |
| 3,789,743 | A | 2/1974 | Sihon |
| 3,842,715 | A | 10/1974 | Maier |
| 3,930,472 | A | 1/1976 | Athenstaedt |
| 4,013,057 | A | 3/1977 | Guenther |
| 4,363,293 | A | 12/1982 | Munoz et al. |
| 4,662,319 | A | 5/1987 | Ayoul |
| 5,072,654 | A * | 12/1991 | MacGregor ............... 92/157 |
| 5,913,960 | A * | 6/1999 | Fletcher-Jones .......... 92/219 |
| 6,862,976 | B2 * | 3/2005 | Gaiser et al. ............. 92/186 |
| 6,973,723 | B2 * | 12/2005 | Cagney et al. ........ 29/888.047 |
| 8,065,985 | B2 * | 11/2011 | Schneider ............... 123/193.1 |
| 2007/0074685 | A1 * | 4/2007 | Walz ....................... 123/90.6 |
| 2007/0074695 | A1 * | 4/2007 | Gildemeister et al. ..... 123/193.6 |
| 2009/0084260 | A1 * | 4/2009 | Christopher ............... 92/187 |
| 2010/0258064 | A1 * | 10/2010 | Rebello ................... 123/41.35 |
| 2010/0275861 | A1 * | 11/2010 | Schneider ............... 123/41.35 |
| 2011/0146074 | A1 * | 6/2011 | Ribeiro ................... 29/888.044 |
| 2012/0037112 | A1 * | 2/2012 | Muscas ................... 123/193.6 |
| 2013/0047948 | A1 * | 2/2013 | Heuschmann ............ 123/193.6 |

FOREIGN PATENT DOCUMENTS

| | | |
|---|---|---|
| DE | 3511852 | 2/1987 |
| EP | 0189767 | 1/1986 |

* cited by examiner

REDUCED COMPRESSION HEIGHT PISTON AND PISTON ASSEMBLY THEREWITH AND METHODS OF CONSTRUCTION THEREOF

CROSS-REFERENCE TO RELATED APPLICATIONS

This application claims the benefit of U.S. Provisional Application Ser. No. 61/706,621, filed Sep. 27, 2012, and 61/794,216, filed Mar. 15, 2013, both of which are incorporated herein by reference in their entirety.

BACKGROUND OF THE INVENTION

1. Technical Field

This invention relates generally to internal combustion engines, and more particularly to pistons and their method of construction.

2. Related Art

Engine manufacturers are encountering increasing demands to improve engine efficiencies and performance, including, but not limited to, improving fuel economy, improving fuel combustion, reducing oil consumption, increasing the exhaust temperature for subsequent use of the heat within the vehicle, increasing compression loads and temperature within the cylinder bores, decreasing weight and making engines more compact. In order to achieve these goals, the size and compression height of the piston need to be reduced, however, the increased temperature and compression loads within the combustion chamber require maintaining the piston within workable thermal and loading limits. As such, although desirable to increase the temperature and compression loads within the combustion chamber, there is a tradeoff in that these increases limit the degree to which the compression height, and thus, overall engine size, can be decreased. Further, the degree to which the weight of the engine can be reduced is compromised in that the increased temperature and load demands placed on the piston require that they be made of steel.

A piston constructed in accordance with this invention overcomes the aforementioned disadvantages of known piston constructions and other disadvantages, as will become apparent to those skilled in the art upon reading the disclosure and viewing the drawings herein.

SUMMARY OF THE INVENTION

A piston constructed in accordance with this invention is constructed of steel, thereby providing the piston with enhanced strength and durability to withstand increased compression loads within a cylinder bore, such as those seen in modern high performance engines. Further, due to the novel configuration of the piston, the compression height (CH) and weight of the piston are able to by minimized, thereby allowing an engine in which the pistons are deployed to be made more compact and lightweight.

In accordance with one aspect of the invention, a piston assembly for an internal combustion engine is provided. The piston assembly includes a piston head having an upper combustion wall with an undercrown surface and a ring belt region depending from the upper combustion wall. The piston head has a floor with an upper surface and a bottom surface. The floor is spaced beneath the upper combustion wall in radial alignment with the ring belt region. A substantially enclosed, annular cooling gallery is bounded by the undercrown surface and the floor, wherein the cooling gallery extends radially inwardly from the ring belt region. A pair of pin bores depends directly from the floor of the cooling gallery. The assembly further includes a pin having ends configured for oscillating receipt in the pin bores. A pin bearing surface extends within the pin bores and between the pin bores in the lower surface of the floor. The assembly further includes a connecting rod having an end fixed to the pin for conjoint oscillation therewith.

In accordance with another aspect of the invention, at least one support extends between the undercrown surface and the upper surface of the floor.

In accordance with another aspect of the invention, the at least one support member extends along a central longitudinal axis of the piston head.

In accordance with another aspect of the invention, the at least one support member includes a plurality of support members extending radially outwardly from a central longitudinal axis of the piston head.

In accordance with another aspect of the invention, an opening extends through the floor, wherein the opening is centrally located along a central longitudinal axis of the piston head.

In accordance with another aspect of the invention, the piston head includes a top part and a bottom part, wherein the top part has an annular first upper joining surface depending from the upper combustion surface and a second joining surface depending from the upper combustion surface along a central longitudinal axis of the piston. The bottom part has an annular lower joining surface extending upwardly from the floor, wherein the lower joining surface is bonded to the first upper joining surface at a first bond joint and an upper surface of the floor is bonded to the second joining surface at a second bond joint.

In accordance with another aspect of the invention, an inlet lubrication feed port extends into the cooling gallery and an outlet lubrication feed port extends out of the cooling gallery in tangential relation with the pin.

In accordance with another aspect of the invention, the pin has a through hole and the connecting rod has an oil passage aligned with the through hole for oil flow through the connecting rod through the wrist pin and into contact with the pin bearing surface.

In accordance with another aspect of the invention, the cooling gallery is completely closed.

In accordance with another aspect of the invention, the closed cooling gallery contains a coolant.

In accordance with another aspect of the invention, the coolant within the closed cooling gallery is a high thermal conductivity metal-containing composition.

In accordance with another aspect of the invention, a piston for an internal combustion engine is provided. The piston includes a piston head having an upper combustion wall with an undercrown surface and a ring belt region depending from the upper combustion wall. The piston further includes a floor having an upper surface and a bottom surface. The floor is spaced beneath the upper combustion wall in radial alignment with the ring belt region. A substantially enclosed, annular cooling gallery is bounded by the undercrown surface and the floor. The cooling gallery extends radially inwardly from the ring belt region. A pair of pin bores depends directly from the floor of the cooling gallery. A pin bearing surface extends within the pin bores and between the pin bores on the lower surface of the floor.

In accordance with another aspect of the invention, the piston can further include at least one support extending between the undercrown surface and the upper surface of the floor.

In accordance with another aspect of the invention, the at least one support member can extend along a central longitudinal axis of the piston head.

In accordance with another aspect of the invention, the at least one support member can be provided as a plurality of support members extending radially outwardly from a central longitudinal axis of the piston head.

In accordance with another aspect of the invention, the piston can further include an opening extending through the floor, wherein the opening is centrally located along a central longitudinal axis of the piston head.

In accordance with another aspect of the invention, the piston head can include a top part and a bottom part, wherein the top part has an annular first upper joining surface depending from the upper combustion surface and a second joining surface depending from the upper combustion surface along a central longitudinal axis of the piston. The bottom part has an annular lower joining surface extending upwardly from the floor. The lower joining surface is bonded to the first upper joining surface at a first bond joint and an upper surface of the floor is bonded to the second joining surface at a second bond joint.

In accordance with another aspect of the invention, the cooling gallery can be completely enclosed.

In accordance with another aspect of the invention, the enclosed cooling gallery can contain a coolant.

In accordance with another aspect of the invention, a method of constructing a piston assembly for an internal combustion engine is provided. The method includes forming a piston head having an upper combustion wall with an undercrown surface and a ring belt region depending from the upper combustion wall and having a floor spaced beneath the upper combustion wall in radial alignment with the ring belt region, with a substantially enclosed, annular cooling gallery bounded by the undercrown surface and the floor. Further, forming a pair of pin bores extending directly from the floor of the cooling gallery, and forming a pin bearing surface extending within the pin bores and between the pin bores within a lower surface of the floor. Further yet, inserting a pin for oscillating receipt in the pin bores, and fixing an end of a connecting rod directly to the pin for conjoint oscillation therewith.

In accordance with another aspect of the invention, the method further includes forming at least one support extending between the undercrown surface and an upper surface of the floor.

In accordance with another aspect of the invention, the method further includes forming the at least one support along a central longitudinal axis of the piston head.

In accordance with another aspect of the invention, the method further includes forming the at least one support member as a plurality of support members extending radially outwardly from a central longitudinal axis of the piston head.

In accordance with another aspect of the invention, the method further includes forming an opening extending through the floor, wherein the opening is centrally located along a central longitudinal axis of the piston head.

In accordance with another aspect of the invention, the method further includes forming the piston head having a top part and a bottom part and bonding the top part to the bottom part.

In accordance with another aspect of the invention, the method further includes forming an outlet lubrication port extending out of the cooling gallery in tangential relation with the pin.

In accordance with another aspect of the invention, the method further includes forming a through hole in the pin and forming an oil passage in the connecting rod and aligning the oil passage with the through hole to allow oil flow through the connecting rod and through the wrist pin into contact with the pin bearing surface.

In accordance with another aspect of the invention, the method further includes forming the cooling gallery as a completely closed cooling gallery.

In accordance with another aspect of the invention, the method further includes providing a coolant within the completely closed cooling gallery.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 2A is a cross-sectional view taken generally along a pin bore axis of a top part of the piston of FIG. 12;

DETAILED DESCRIPTION OF PRESENTLY PREFERRED EMBODIMENTS

Figure 1:
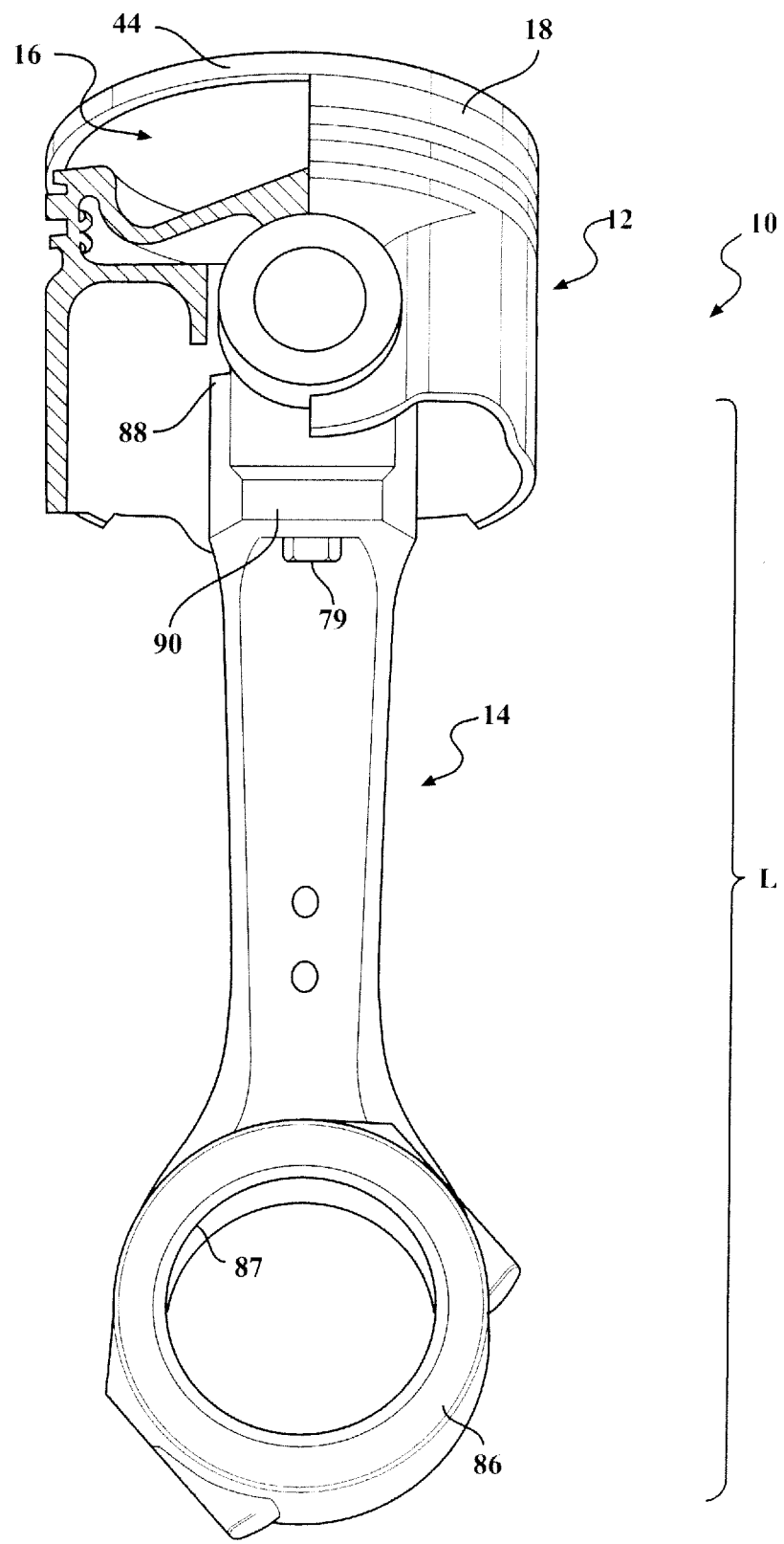
FIG. 1 is a partially sectioned perspective view of a piston and connecting rod assembly constructed in accordance with one aspect of the invention.
Figure 4:
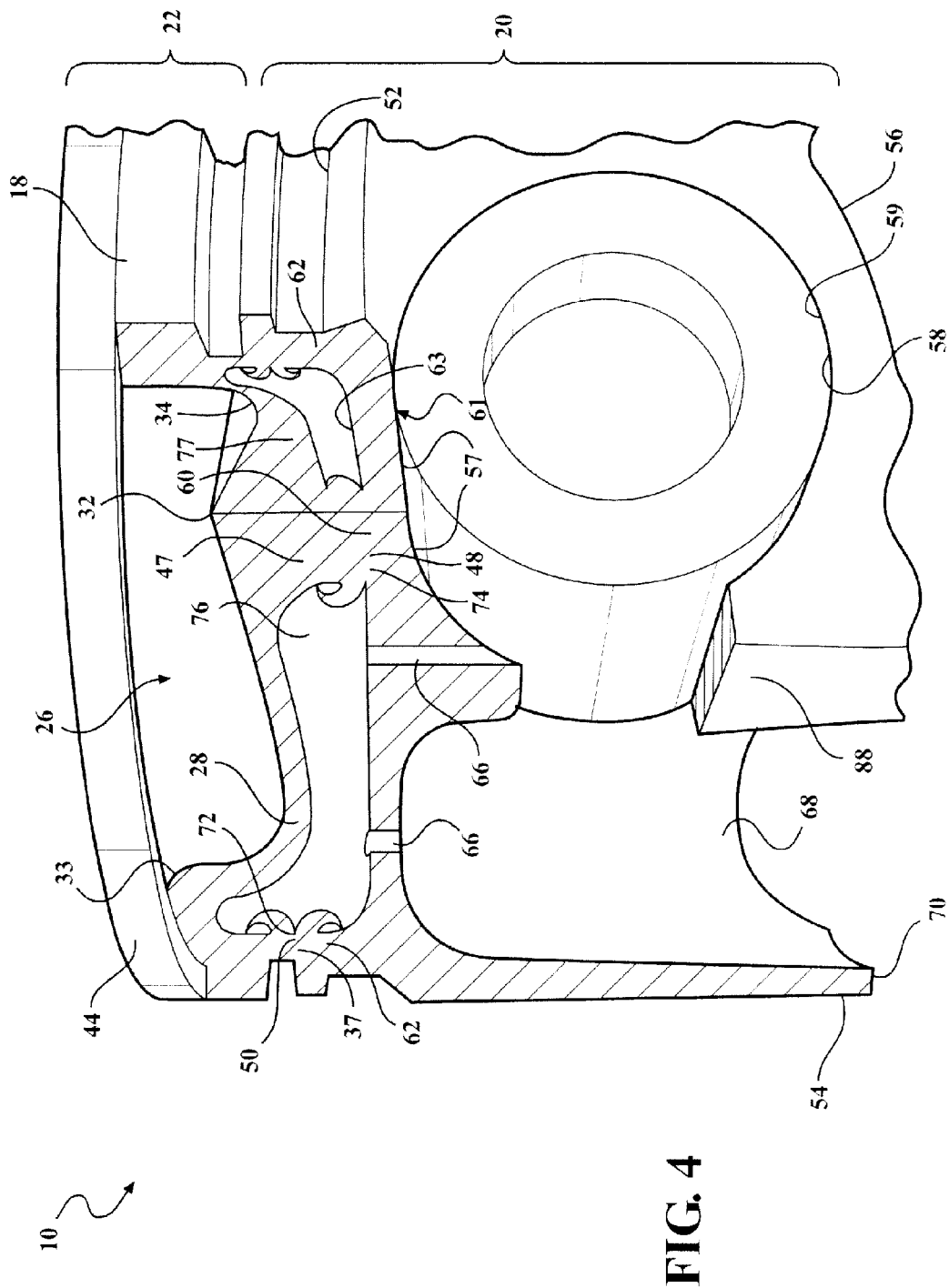
FIG. 4 is a partially sectioned side perspective view of the assembly of FIG. 1.
Figure 5:
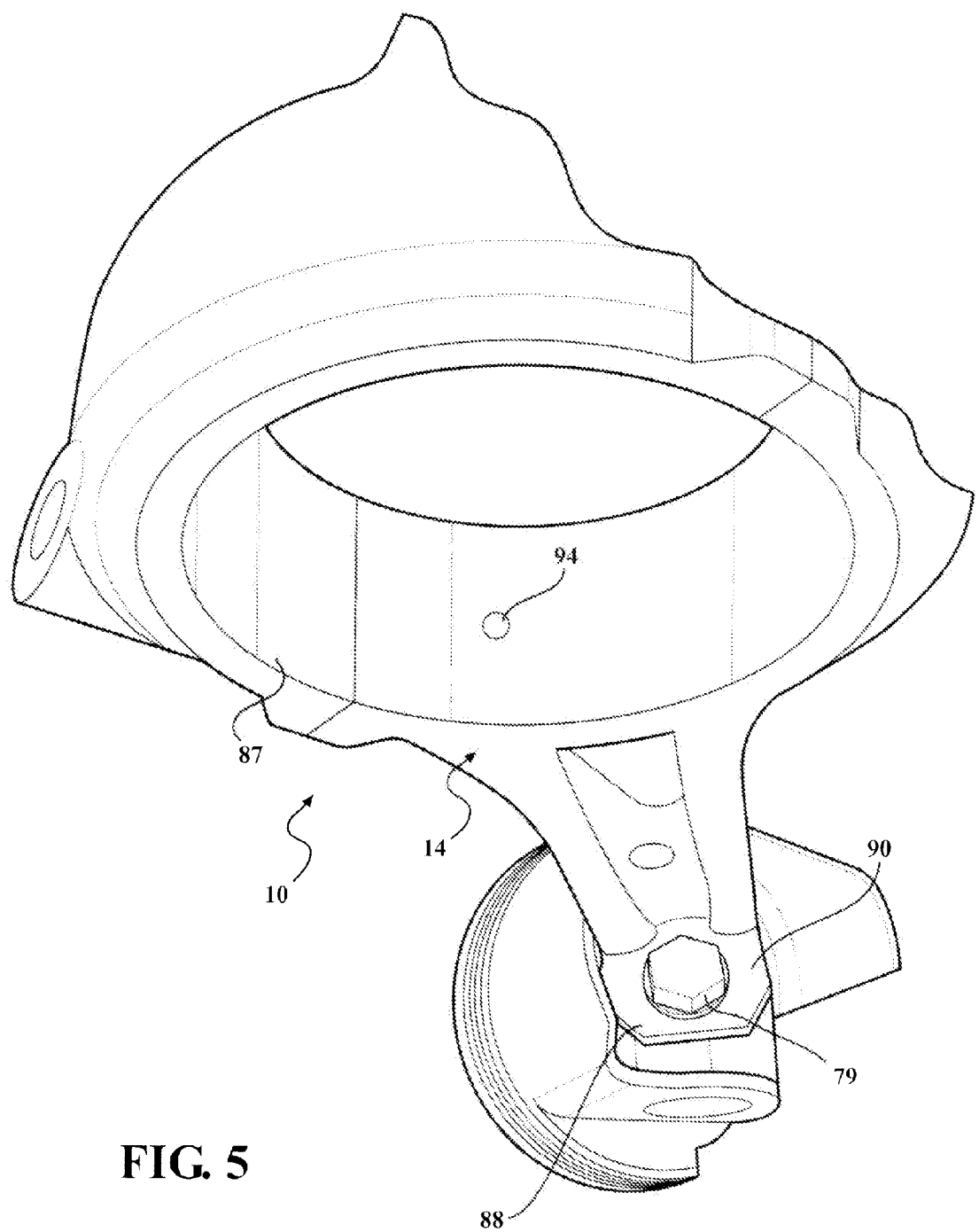
FIG. 5 is a bottom perspective view of the assembly of FIG. 1.
Figure 6:
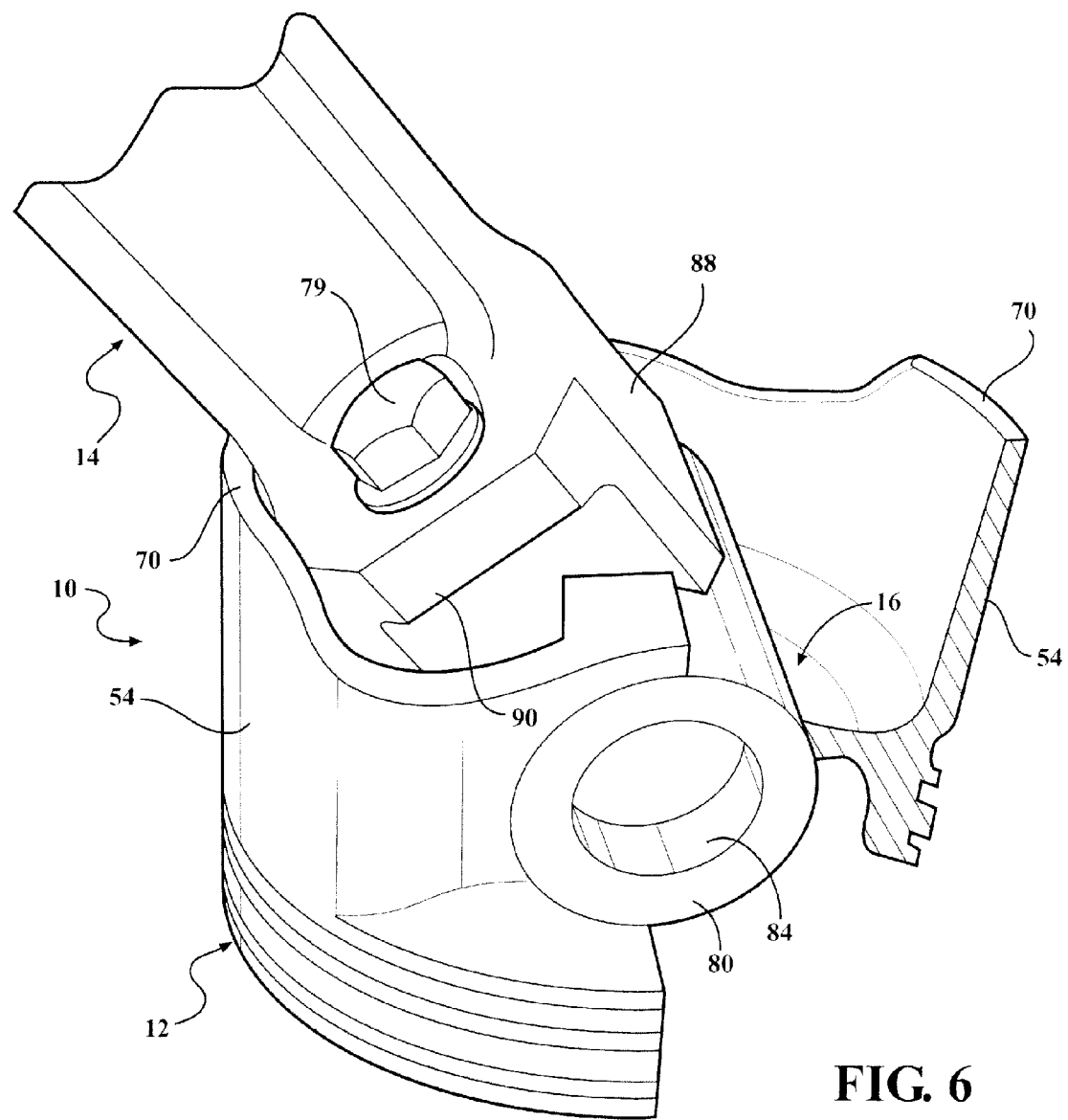
FIG. 6 is a partially sectioned perspective view of a small end of the connecting rod shown bolted to a wrist pin of the assembly of FIG. 1.

Referring in more detail to the drawings, FIG. 1 illustrates a partially sectioned perspective view of a piston and connecting rod assembly, referred to hereafter as assembly 10, constructed in accordance with one presently preferred embodiment of the invention, for reciprocating movement in a cylinder bore or chamber (not shown) of an internal combustion engine, such as a modern, compact, high performance vehicle engine, such as a gas or diesel engine for example. The assembly 10 includes a piston 12, a connecting rod 14 and a wrist pin 16. The connecting rod 14 is operably connected to the piston 12 via fixed attachment to the wrist pin 16 for conjoint oscillation with the wrist pin 16. The piston 12 has a body 18 made of at least two separate pieces that are initially fabricated as separate parts and subsequently joined to one another within a head region across some form of a weld joint (i.e., induction weld, friction weld, braze joint, charge carrier rays, laser, resistance, and the like). The two parts, as identified in FIGS. 2 and 4, comprise a bottom part 20, and a top part 22. Reference to "top", "bottom", "upper" and "lower" herein are relative to the piston 12 being oriented along a vertical longitudinal central piston axis A along which the piston 12 reciprocates in use. This is for convenience and is not to be limiting since it is possible that the piston 12 may be installed and operate at an inclination other than purely vertical. Due to the open construction of the bottom and top parts 20, 22 of the piston, the bottom and top parts 20, 22 can be cast, machined or forged of steel to near net shape. The material (i.e., the steel alloy) used to construct the bottom and top parts 20, 22 may be the same (e.g., SAE 1040 grade) or different, depending on the requirements of the piston 12 in the intended engine application. The top part 22 may be cast, may be machined from stock, may be sintered, forged or made by any number of processes. The bottom and top parts 20, 22, being constructed of steel, provide the piston 12 with enhanced strength and durability to withstand increased temperature and compression loads within the cylinder bore, and due to their novel configuration, along with the wrist pin 16 and connecting rod 14, minimize the weight and compression height CH (identified in FIG. 2) of the piston 12, thereby allowing an engine in which the pistons 12 are deployed to achieve enhanced performance and attain a reduced weight and to be made more compact.

Figure 2:
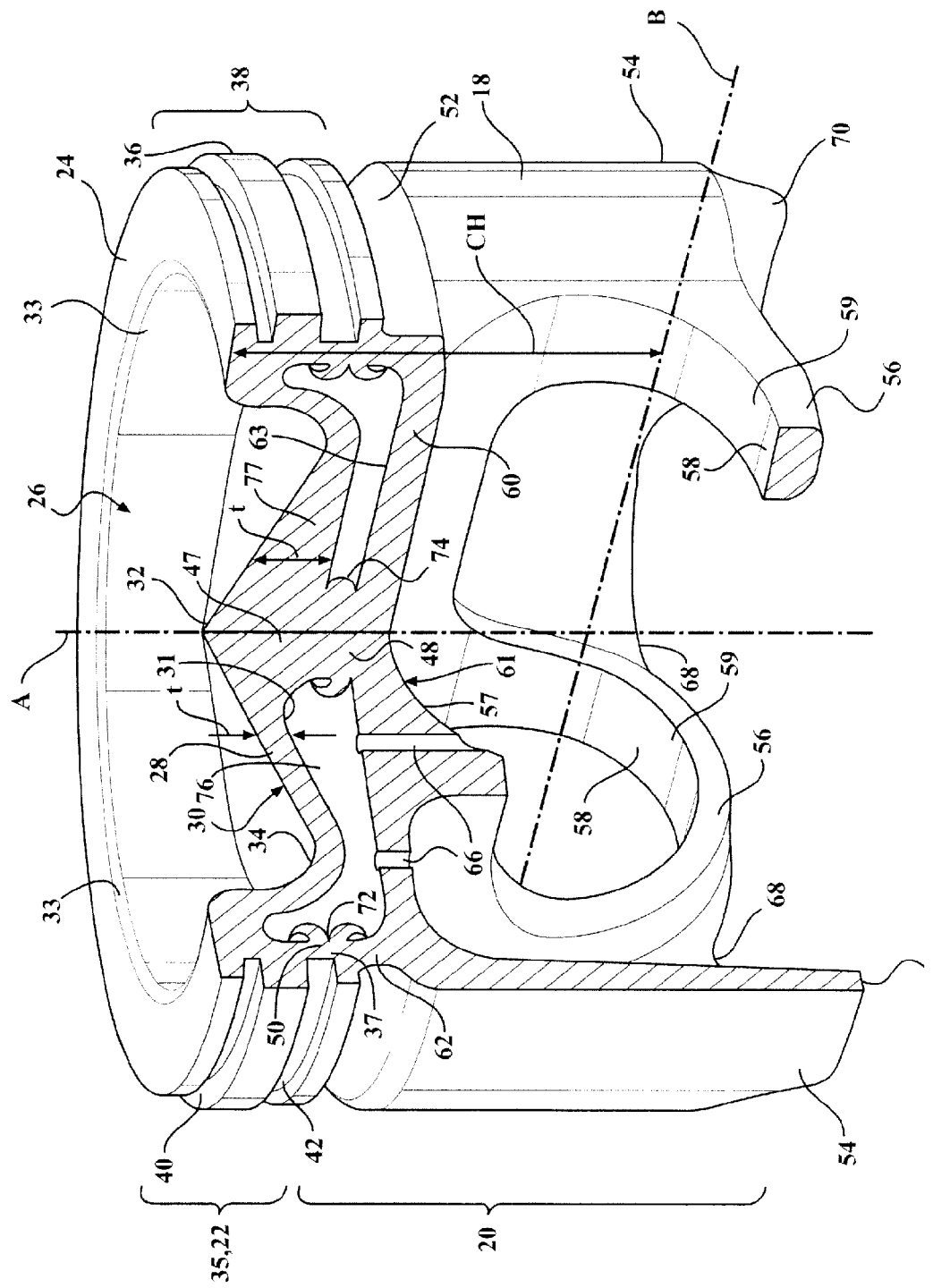
FIG. 2 is a partially sectioned perspective view of the piston of the assembly of FIG. 1.

As shown in FIG. 2, a head region of the piston 12 has an annular top wall 24 which surrounds an annular combustion bowl 26 that is recessed below an uppermost combustion surface of the top wall 24. The combustion bowl 26 is demarcated by a wall 28 having a thickness (t), wherein the thickness extends between an upper surface 30 and lower surface 31 of the wall 28. The contour of the combustion bowl 26 is formed by the upper surface 30 of the top wall 28, wherein the upper surface 30 is shown as being contoured to provide an upper apex or center peak 32 that may lie coaxially along the central axis A of the piston 12 or may be radially offset relative to the piston central axis A. The contour of the combustion bowl wall 28 also provides an annular valley 34 which surrounds the peak 32, shown as being concentric in relation to the peak 32 and forming the lowest portion of the combustion bowl 26. The wall 28 of the combustion bowl 26 extends upwardly from the valley 34 to form a combustion bowl rim 33, which typically is where the greatest heat is generated during use.

The top part 22 of the piston 10 further includes an upper portion 35 of an annular outer wall 36 that extends downwardly from the top wall 24 to an annular, radially outermost, first upper joining surface 37. A ring belt 38 is shown as being at least partially formed in the upper portion 35 of the outer wall 36. The ring belt 38 has a plurality of outer annular ring grooves, shown as a pair of ring grooves 40, 42, by way of example and without limitation, in which piston rings 44 are received. The ring grooves 40, 42 shown include an uppermost ring groove 40 formed entirely within the top part 22 immediately adjacent the top wall 24 of the piston head region for receipt of the uppermost compression piston ring 44, shown as an L-shaped dykes-type ring, by way of example and without limitation, with an upper free end of the piston ring 44 being flush or substantially flush with the top wall 24. The lowermost ring groove 42 is shown as being formed partially by the top part 22 and partially by the bottom part 20.

Figure 15:
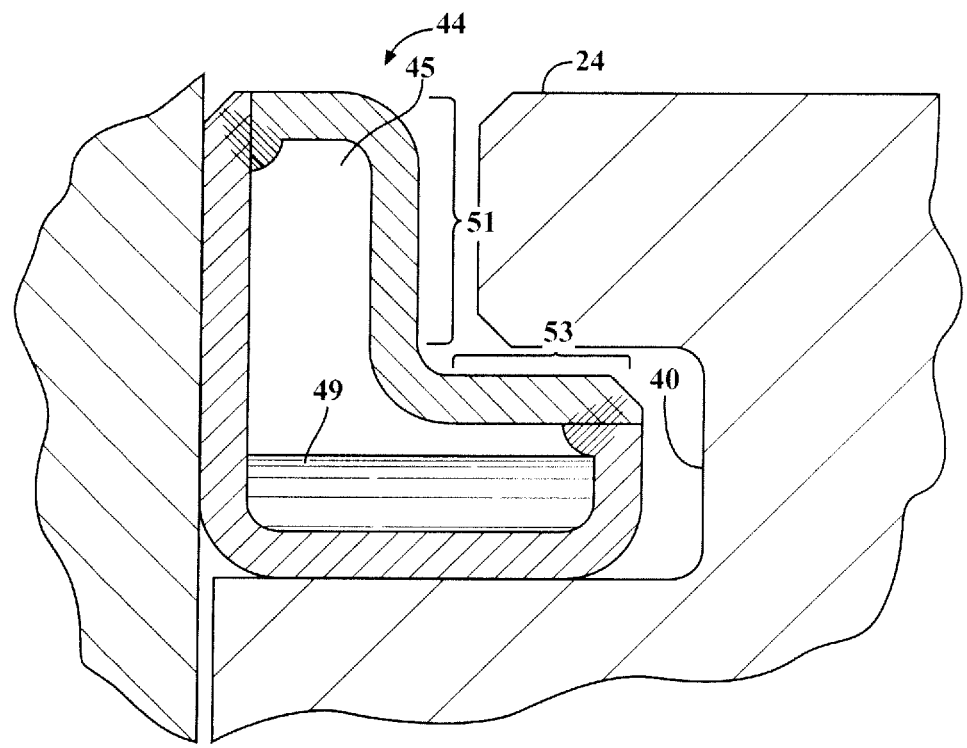
FIG. 15 is a cross-sectional view of a piston ring constructed in accordance with one aspect of the invention.

As shown in FIG. 15, the L-shaped dykes-type ring 44 can be provided having a hollow annular cooling chamber 45 for receipt of a cooling medium 49, such as an inert gas, e.g. argon and/or liquid coolant. The ring 44 has a first portion 51 providing the upstanding or vertically extending leg of the L-shaped configuration and a second portion 53 providing a laterally or horizontally extending leg of the L-shaped configuration. The upstanding first portion 51 is received in an annular space between the upper land and a cylinder liner and the second portion 53 is received in the ring groove 40. The L-shaped piston ring 44 has a cylindrical outer surface sized for close sliding movement with the cylinder liner to provide the desired sealing between the piston upper land region and the cylinder liner. The laterally extending second portion 53 has outer surfaces dimensioned for a loose fit within the ring groove 40, thereby allowing the piston ring 44 to float freely within the ring groove 40 during use. It should be recognized that standard piston rings could be used, if desired for the intended application.

An enclosed piston ring cooling chamber 45 is bounded by inner surfaces of the upstanding and laterally extending portions 51, 53. The inner surfaces are configured such that during use, the coolant medium 49 is sloshed throughout the cooling chamber 45 in "cocktail shaker" like fashion to provide optimized cooling to the surrounding upper land region. As shown in FIG. 15, the inner surfaces of the upstanding portion 51 can be parallel or substantially parallel with one another, and the inner surfaces of the laterally extending portion 53 can be parallel or substantially parallel with one another, and the wall thickness of the piston ring 44, as shown in cross-section, can be uniform throughout.

Figure 15A:
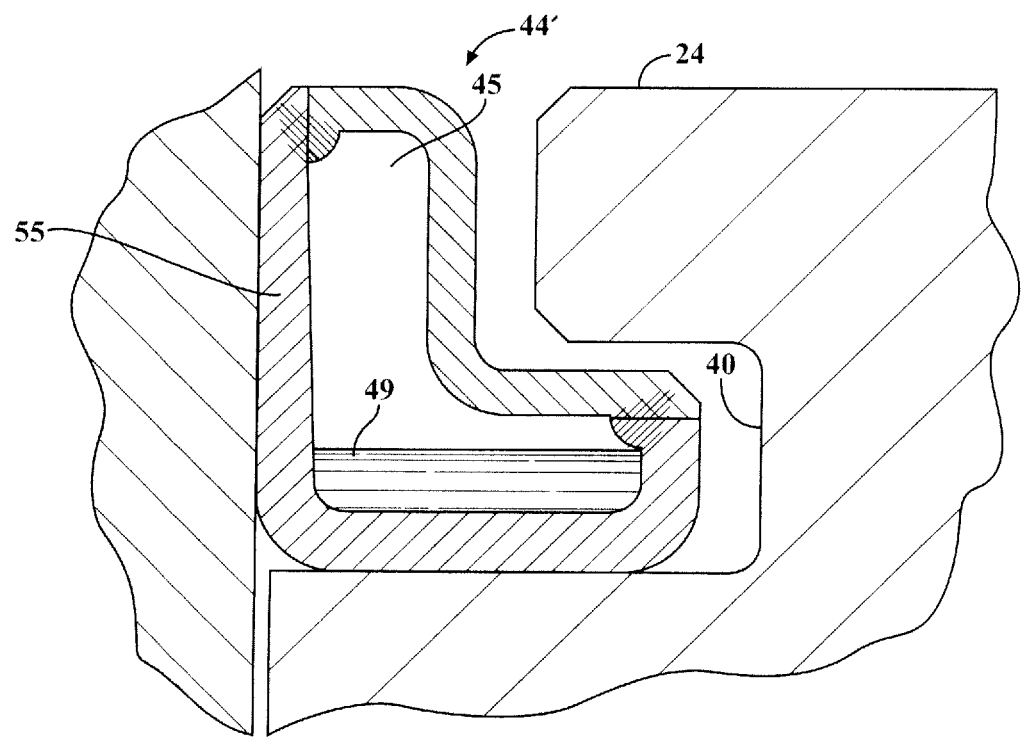
FIG. 15A is a cross-sectional view of a piston ring constructed in accordance with another aspect of the invention.

In contrast, as shown in FIG. 15A in accordance with a further aspect of the invention, the wall thickness of a piston ring 44' constructed in accordance with another aspect of the invention, as shown in cross-section, is non-uniform throughout. In particular, an upstanding outer leg 55 has a non-uniform thickness extending along its length, such that the thickness is continuously or substantially continuously varying along its entire length, with thinnest region located at an uppermost end of the outer leg 55 and a thickest region located at a lowermost end of the outer leg 55. As shown, the inner surface of the outer leg 55 diverges radially outwardly as its extends upwardly toward the upper combustion surface 24. The inclined inner surface facilitates cooling of the upper land region by altering the fluid flow dynamics of the coolant medium 49 within the enclosed cooling chamber 45 of the piston ring 44', thereby enhancing the transfer of heat to outwardly to the cylinder liner. As the coolant medium 49 flows downwardly or otherwise moves downwardly relative to the inclined inner surface, the coolant medium 49 is caused to flow radially inwardly, thereby facilitating the agitation of the coolant medium 49 throughout the entire cooling chamber 45.

Figure 16:
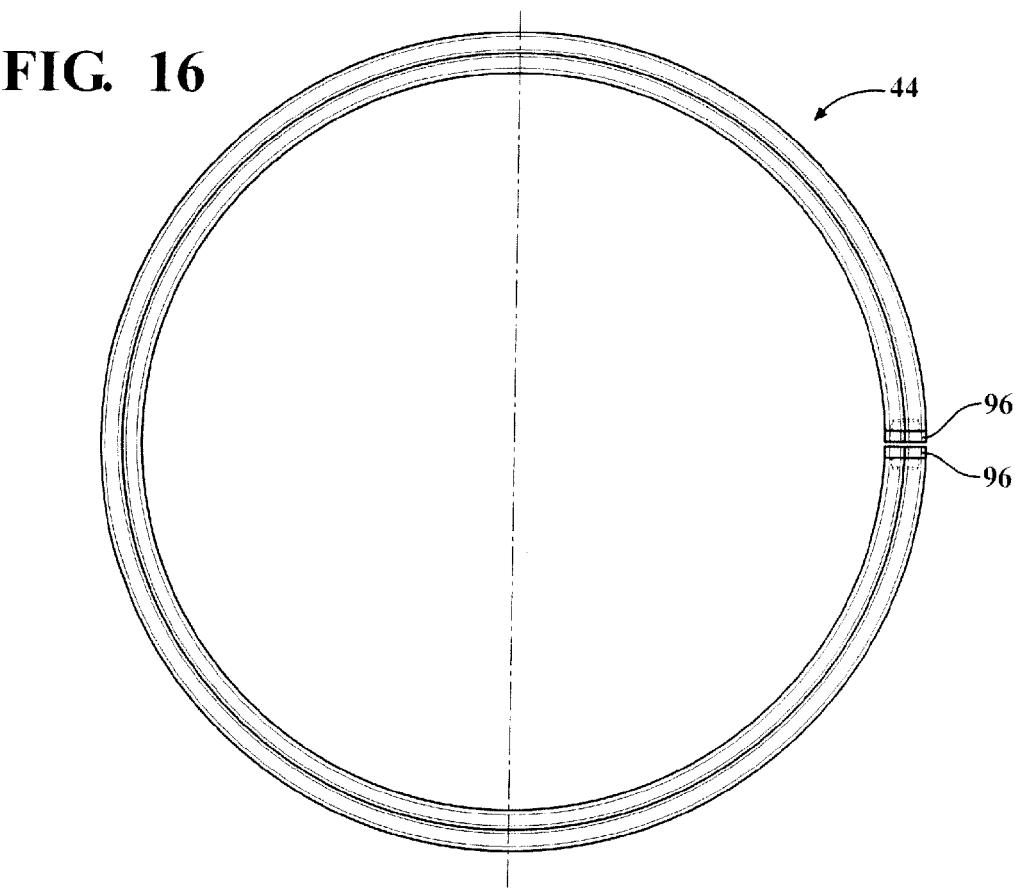
FIG. 16 is a plan view of the piston rings of FIGS. 15 and 15A.
Figure 17:
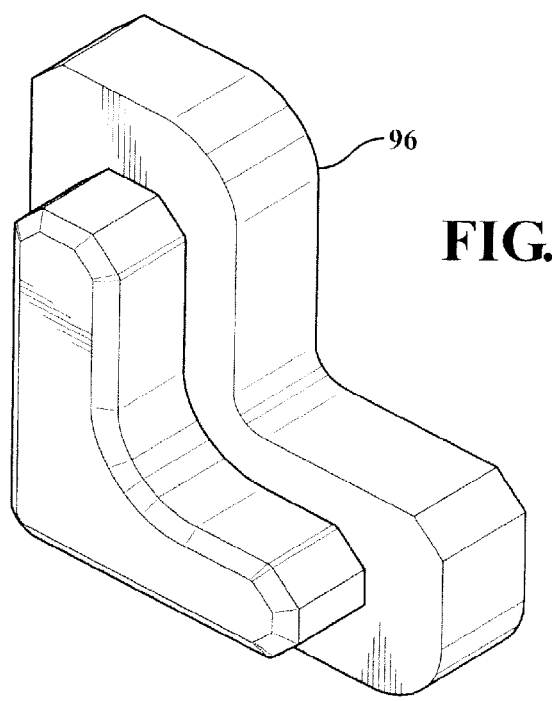
FIG. 17 is a perspective view of an end cap of the piston ring of FIG. 16.

As shown in FIG. 16, the L-shaped piston ring 44, 44' is formed having a pair of end caps 96 that act to plug opposite free ends of the cooling chamber 45. Accordingly, the coolant medium 49 is maintained within the cooling chamber 45 and kept from leaking outwardly therefrom. The end plugs 96 can be fixed with the free ends via any suitable mechanism, including adhesives and/or weld joints, for example.

In manufacture, the piston ring 44, 44' can be constructed from a plurality of separate pieces of flat sheet metal material, wherein the individual, relatively long and narrow pieces of the sheet material are cold formed, such as in a progressive die stamping operation, for example, to take on a cylindrical configuration and then are cold formed or otherwise stamped to attain their respective unground finished shapes. Then, upon forming the individual pieces, the pieces are fixed to one another, including the end plugs, via a weld or braze joint, or suitable adhesive for the end plugs, then finish processes can be performed, such as grinding and coating, for example, to complete manufacture of the piston ring. It should be recognized that prior to completely sealing off the cooling chamber, the coolant medium 49, which can be provided as a solid material at ambient temperature and pressure, or as an inert gas, e.g. argon, is disposed within the cooling chamber 45.

Figure 18:
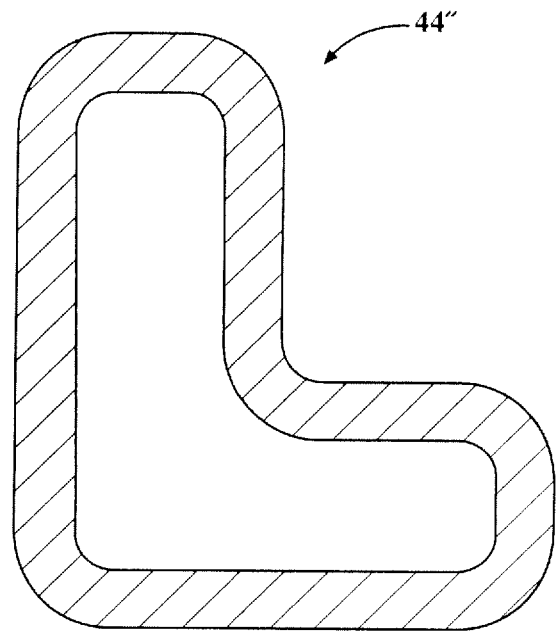
FIG. 18 is a cross-sectional view of a piston ring constructed in accordance with another aspect of the invention.
Figure 18A:
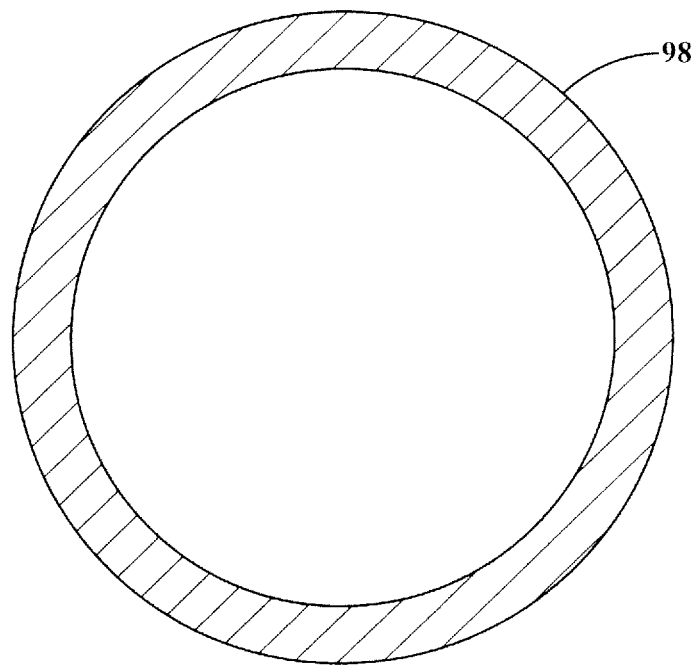
FIG. 18A is a cross-sectional view of the piston ring of FIG. 18 prior to being formed.

In FIG. 18, a piston ring 44" is shown as constructed in accordance with a further aspect of the invention. The piston ring 44", rather than being formed from a plurality of separate pieces of strip metal fixed to one another, is formed from a solid piece of tubular metal 98 (FIG. 18A). The piston ring 44" is ultimately formed having the same end shape, and thus, the shape is not discussed in further detail here. End plugs are installed in the open ends of the tube, as discussed above.

The top part 22 further includes a support member, also referred to as pillar 47. The pillar 47, by way of example and without limitation, shown as being formed as a monolithic piece of material with the top part 22, depends from the lower surface 31 of the combustion bowl wall 28 to a second upper joining surface 48. The pillar 47 is shown as extending coaxially along the longitudinal central axis A, thereby acting as a central support to the combustion bowl wall 28, and thus, enhancing the ability of the combustion bowl wall 28 to withstand the extreme combustion forces encountered in use. Accordingly, the piston 12 is well suited for the most modern diesel engines which generate extreme combustion pressures. Otherwise, the portion of the combustion bowl wall 28 extending between the pillar 47 and the outer wall 36 remains unsupported.

The bottom part 20 is fixed to the top part 22 via, at least in part, an outer annular lower joining surface 50. The lower joining surface 50 is shown as forming a bottom surface of the lower ring groove 42. A recessed annular pocket 52 is formed immediately beneath the lower joining surface 50 to facilitate scraping oil from a wall of the cylinder liner. The pocket 52 acts as area in which the scraped oil can at least temporarily collect, thereby facilitating lubrication and reduction of friction between the piston 12 and the cylinder liner. A pair of skirt panels 54 depends from the annular pocket 52, wherein the skirt panels 54 are reduced in area for low impact and low friction sliding movement along the cylinder bore wall.

The bottom part 20 further includes a pair of pin bosses 56 depending immediately beneath the annular pocket 52. The pin bosses 56 each have a pin bore 58, preferably bushless given the steel construction, wherein the pin bores 58 are spaced from one another coaxially along a pin bore axis B that extends transverse to the central longitudinal axis A. The pin bores 58 each have an uppermost wrist pin bearing surface 57 and a lowermost surface 59, with the wrist pin bearing surface 57 extending tangent with, or extending slightly into a bottom surface 61 of a floor 60 of the bottom part 20, wherein the wrist pin bearing surface 57 extends within (interior of) and between (exterior of) the pin bosses 56. Accordingly, the wrist pin bearing surface 57 extends continuously and uninterrupted between the pin bosses 56.

Figure 3:
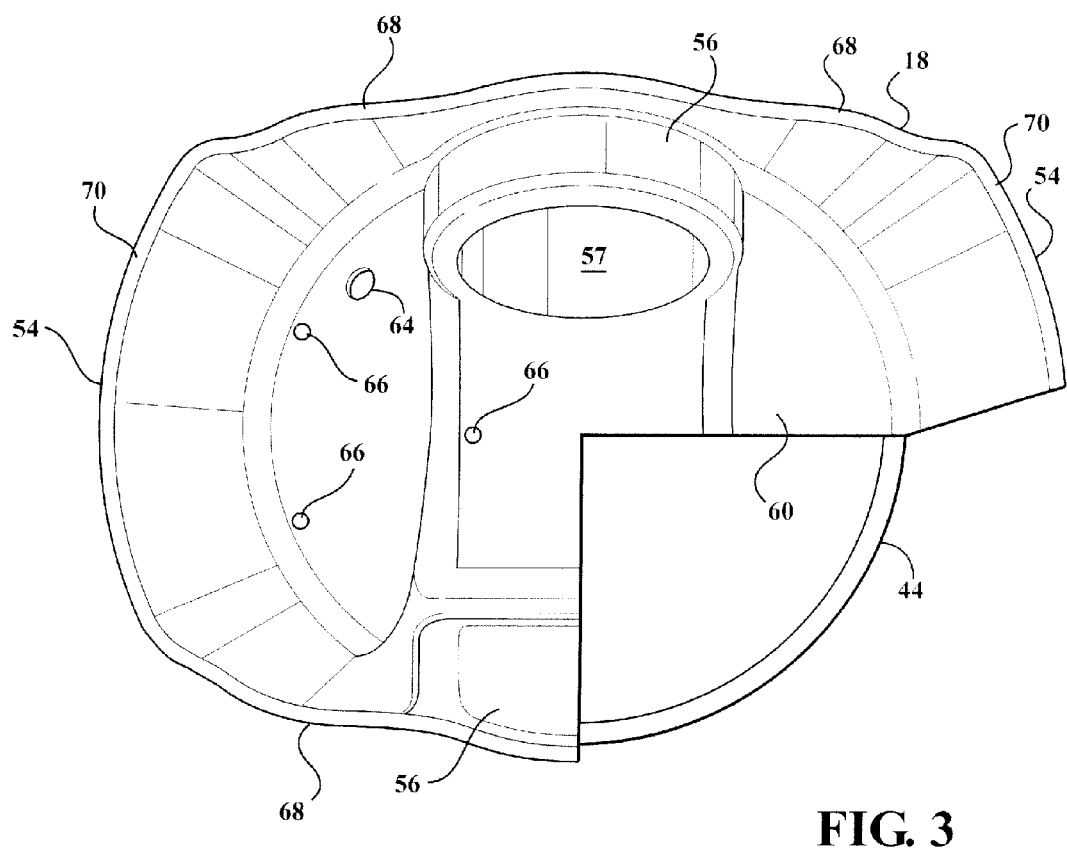
FIG. 3 is a bottom view of the piston of FIG. 2.

The floor 60 provides a planar or substantially planar surface extending across the entire or substantially entire upper region of the bottom part 20. The lower joining surface 50 is slightly elevated from an upper surface 63 the floor 60 by an upstanding annular rim 62, wherein the lower joining surface 50 is formed at a free end of the rim 62. If desired, to facilitate cooling the piston 12 and lubricating the wrist pin 16, the floor 60 can include at least one, and shown as a plurality of openings, shown as having at least one inlet 64 (FIG. 3) and at least one drainage opening, also referred to as outlet 66. The inlet 64 is shown as being spaced between the pin bores 58 and one of the skirt panels 54. The outlet 66 is shown as extending tangentially or substantially tangentially with the wrist pin 16. Accordingly, oil flowing through the outlet 66 cools and lubricates the wrist pin 16. The pin bosses 56 are joined to the skirt panels 54, which are formed as a monolithic piece of material with the bottom part 20 and are thus, formed integrally as a monolithic piece of material with the pin bosses 56. The skirt panels 54 are joined along their longitudinally extending sides directly to the pin bosses 56 via strut portions 68, such that the skirts panels 54 are arranged diametrically opposite one another across opposite sides of the pin bosses 56. The skirt panels 54 have convex outer surfaces contoured for cooperation with the wall of the cylinder bore to maintain the piston 10 in a desired orientation as it reciprocates through the cylinder bore. The skirt panels 54 are each joined at their upper ends and formed as one piece (e.g., cast) with the lower portion of the ring belt 44, wherein the annular pocket 52 extends between the skirt upper ends and the lowermost ring groove 42. The skirt panels 60 extend longitudinally generally parallel with the central axis A downward from the ring belt 38 to bottom or lower ends 70 which are tangent or substantially tangent with lowermost surfaces 59 of the pin bores 58 (shown as extending slightly beneath the lowermost surfaces 59).

A first weld joint 72 that unites the separately made top and bottom parts 22, 20 of the piston 12 is formed between the annular lower joining surface 50 of the bottom part 20 and the first upper joining surface 37 of the top part 22. Further, a second weld joint 74 is preferably formed between the second upper joining surface 48 and the upper surface 63 of the floor 60. It should be recognized that the first weld joint 72 can be formed in other locations within the ring belt 38 by changing the respective lengths of the outer wall 36 and rim 62.

Figure 2A:
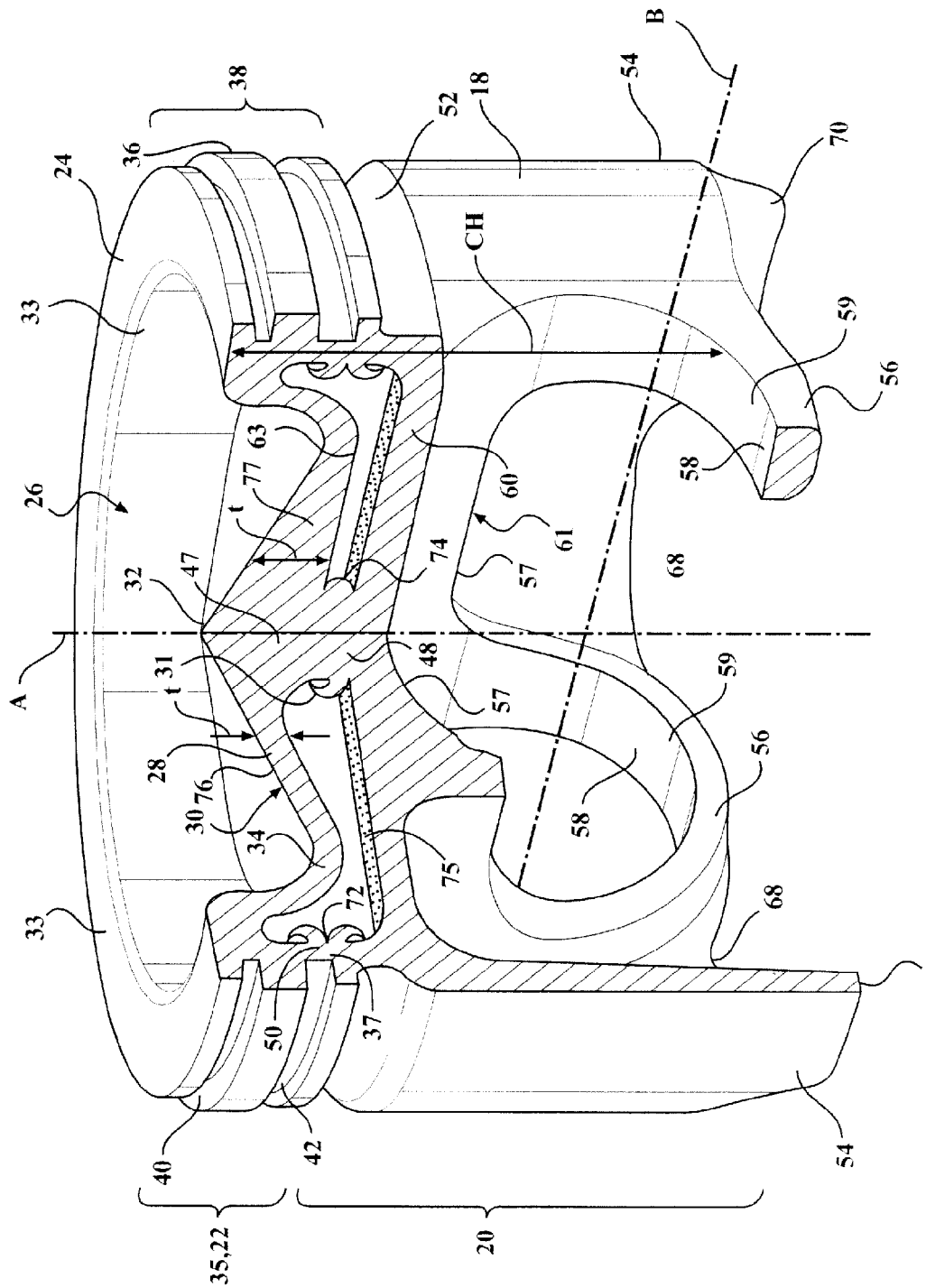
FIG. 2A is a view similar to FIG. 2 illustrating an embodiment of a piston in accordance with another aspect of the invention.

Upon fixing the bottom and top parts 20, 22 to one another, an enclosed (absent any openings in the floor 60, thereby being fully sealed) or substantially enclosed cooling gallery 76 (one of more openings in the floor 60) is formed. If formed as a completely sealed cooling gallery 76, as shown in FIG. 2A, a coolant 75, such as in the form of a metal-containing coolant composition 75, by way of example and without limitation, can be sealed within the cooling gallery 76. It should be recognized that a standard coolant 75, such as oil, is used if the cooling gallery 76 is not completely sealed. The metal-containing composition 75 is preferably fed into the cooling gallery 76 under an inert, dry atmosphere, typically nitrogen or argon. Regardless, the coolant 75, if provides as a metal-containing composition, may be disposed into the cooling gallery 76 in the form of a solid, liquid, or a mixture of solid particles and liquid. In one embodiment, the metal containing composition 75 comprises an alkali metal, or a mixture of alkali metals; and powdered copper or powdered aluminum, or a mixture of metal powders. The metal-containing composition 75 can alternatively comprise a colloid composition or a suspension of metal particles in a carrier, such as copper particles in silicone oil. The metal-containing composition 75 has a high thermal conductivity and is sealed inside the cooling gallery 76 to dissipate heat away from the crown of the piston 12 during operation of the internal combustion engine. The metal-containing composition 75 sealed in the sealed cooling gallery 76 has a thermal conductivity ranging from 5 to 1000 times higher than cooling oil (0.13 W/m·K), which considerably improves the amount of heat transferred away from the upper crown, compared to the amount of heat transferred by cooling oil. The metal-containing composition 75 preferably has a melting temperature of 63° C. or greater such that the metal-containing composition 75 can be fed or introduced into the cooling gallery in solid form, and then transitions to a liquid during operation of the internal combustion engine.

According to another embodiment, the metal-containing composition 75 sealed in the cooling gallery 76 is a colloid composition, such as a mixture of metal particles and a carrier fluid. For example the colloid composition can include copper particles suspended in silicone oil. The metal particles typically have a particle size less than 149 microns to less than 25 microns (−100 to −550 mesh), more preferably less than 44 microns (−325 mesh). All of the metal particles may have the same size particle, but typically the metal particles have a distribution of particle sizes. For example, 50% by volume of the metal particles may have a particle size of −100 mesh to +400 mesh and 50% by volume of the metal particles may have a particle size of −400 mesh. The metal particles can also have various different structures. For example, the metal particles could be atomized particles, such as those formed by water atomization or gas atomization. Alternatively, the metal particles could be in the form of a strand, sponge, or foam. The metal particles may also be recovered from a waste stream during the production process of other objects, such as brake parts.

The formulation of the metal-containing composition 75 can vary depending on the application and type of material used to form the piston. However, the metal-containing composition 75 typically comprises a mixture of several different metal components together providing a typical thermal conductivity of around 100 W/(m·K) or greater. According to one embodiment, the metal-containing composition 75 includes at least one alkali metal, but preferably a mixture of alkali metals. The alkali metals are found in Group 1 of the Periodic Table of the Elements, which includes lithium (Li), sodium (Na), potassium (K), rubidium, caesium, francium, and ununennium. The alkali metals can be provided as individual elements or as alloys, such as NaK, which is an alloy of sodium and potassium. The alkali metals typically have a high thermal conductivity of about 85 to 141 W/(m·K) and a low melting temperature of about 63 to 181° C. For example, sodium has a thermal conductivity of about 141 W/(m·K) and a melting temperature of about 98° C.; potassium has a thermal conductivity of about 102 W/(m·K) and a melting temperature of about 63° C.; and lithium has a thermal conductivity of about 85 W/(m·K) and a melting temperature of about 181° C. Thus, the alkali metals are provided in the form of a solid at room temperature, but transform to a liquid when exposed to temperatures higher than their melting temperature during operation of the internal combustion engine. Processing under an inert atmosphere has the benefit of allowing for the metal to be fused and poured into the outer cooling gallery as a liquid. The high thermal conductivity of alkali metals allows them to effectively transfer heat away from the upper crown. The alkali metals may be highly reactive and thus the outer cooling gallery containing the alkali metals should be securely sealed. Lithium, sodium and potassium are very reactive, and so are mixtures of these metals.

In addition to the alkali metals, the metal-containing composition 75 is typically a suspension and thus includes another type of metal. The second type of metal preferably has a higher thermal conductivity than the alkali metals, such as copper, aluminum (237 W/m·K), or another element or alloy having a thermal conductivity greater than the thermal conductivity of alkali metals. For example, the metal-containing composition 75 typically includes a first component having a thermal conductivity of 85 to 141 W/(m·K), such as the alkali metals, and a second component having a thermal conductivity of greater than 200 W/(m·K), such as copper (Cu) or aluminum particles. Other examples of high conductivity metals that could be used as the second component include beryllium (Be), tungsten (W), gold (Au), silver (Ag), and magnesium (Mg). During operation of the internal combustion engine, the first component melts and acts as a liquid carrier for the second component, which remains solid and suspended in the liquid carrier even at the high operating temperatures of the internal combustion engine. In this embodiment, the liquid metal provides excellent thermal contact, and the suspended second component improves heat dissipation.

In another embodiment, the metal-containing composition 75 may include two or more of the first components, such as two or more alkali metals, and none of the second components. In yet another embodiment, the metal-containing composition 75 may include two or more of the second components, such as two or more high thermal conductivity metals, and none of the first components. However, some combinations of metal components tend form solid solutions or intermetallics and thus are typically not desirable. Preferred binary combinations used to form the metal-containing composition may include Cu—Li; Cu—Ag; Al—Na; Al—K; Al—Be; Li—Na; Li—K; Na—Mg; K—Mg; Be—Ag; and W—Ag. In addition, Na—K may be used as a metal coolant.

The amount of the higher conductivity second component relative to the amount of first component in the metal-containing composition 75 can also vary depending on the types of metals used in the metal-containing composition, the type of material used to form the piston, and the application. The amount of second component relative to the amount of first component is typically in the range 0:100 to 50:50 by volume, and is preferably 25:75. In one embodiment, the metal-containing composition includes 0 volume percent (vol. %) second component and 100 vol. % first component, based on the total volume of the metal-containing composition. In another embodiment, the metal-containing composition 75 includes 1 to 50 vol. % second component and 50 to 99 vol. % first component. In yet another embodiment, the metal-containing composition 75 includes 10 to 30 vol. % second component and 70 to 90 vol. % first component. In yet another embodiment, the metal-containing composition 75 includes 25 vol. % second component and 75 vol. % first component.

The total amount of metal-containing composition 75 disposed in the outer cooling gallery can also vary depending on the type of metals used, the type of material used to form the piston 12, and the application. The metal-containing composition 75 preferably fills up to 50 vol. % of the outer cooling gallery, and more preferably 20 to 30 vol. % of the outer cooling gallery.

In one particularly preferred embodiment, the metal-containing composition 75 disposed in the outer cooling gallery comprises 75 vol. % alkali metal and 25 vol. % copper particles. The copper particles have a particle size of less than 44 microns (−325 mesh). The alkali metal particles include a mixture of sodium and potassium. In this preferred embodiment, the metal-containing composition 75 fills 20 to 25 vol. % of the total volume of the outer cooling gallery. The opening used to feed the metal-containing composition 75 into the outer cooling gallery can be sealed with the threaded plug and the adhesive, or the metal-containing composition could be introduced prior to joining a top and bottom part to one another. During operation of the internal combustion engine, the alkali metal particles are in the molten state as the temperature in the engine exceeds the melting temperature of the alkali metal. The copper particles however remain solid and are suspended in the liquid alkali metal. The liquid alkali metal carries the copper particles along the inner surfaces of upper and lower crowns, throughout the outer cooling gallery, and thus removes heat from the upper crown.

The piston 12 including the high thermal conductivity metal-containing composition 75 in the sealed outer cooling gallery 76 can provide numerous advantages, in addition to improved heat transfer. The metal-containing composition 75 does not degrade due to high temperatures during the lifetime of the engine, the oil does not come into contact with the very hot piston gallery walls and thus does not degrade as fast, and no coking of the outer cooling gallery 76 occurs. The reduced temperatures of the piston top and bowl rim 33 provided by the metal-containing composition 75 preclude oxidation of the bowl rim 33 and consequent erosion. The re-distribution of heat flow towards the ring belt 38 also reduces carbon deposits on piston lands and reduces degradation of the lubricant oil along the outer surfaces of the piston 12 and thus can extend the time between service intervals of the engine. The absence of carbon build up on the lands impedes liner bore polishing and consequently maintains oil consumption under control. Of course, it should be recognized that any low temperature fuse alloys could be used, depending on the requirements of the intended application. Further, given the inventive configuration of the piston 12, having a greatly reduced cooling chamber height, thereby contributing to the greatly reduced compression height CH, the enhanced thermal conductivity of the coolant medium 75 in the sealed cooling gallery 76 greatly enhances the overall cooling effectiveness of the piston 12. This is because heat removal is directly proportional to the vertical kinetic energy acquired by cooling fluid 75 during reciprocation of the piston 12.

The cooling gallery 76 extends uninterrupted across the full, flat or substantially flat floor 60, with the only exception being in the area occupied by the pillar 47. As such, the cooling gallery 76 is formed as an "open" toroid-shaped region through which oil can flow, thereby enhancing the cooling effectiveness of the oil flowing throughout the cooling gallery 76 and against the lower surface 31 of the combustion bowl wall 28 during use. This is particularly beneficial in cooling the piston 12, particularly the highest temperature regions of the piston 12, namely, the combustion bowl rim 33 and the peak 32, sometimes referred to as bullet-nose region, of the combustion bowl 26. As a result, a true or substantially true isothermal combustion chamber is established, thereby reducing the nitro-oxides generated in use.

The cooling gallery 76 is represented as having a non-uniform configuration about its circumference as a result of the changing thickness (t) of the combustion bowl wall 28. As best shown in FIG. 2, the wall 28 has an increased, non-uniform thickness (t) extending, by way of example and without limitation, along the direction of the pin bore axis B, thereby resulting in a gradually thickening of the wall 28 moving from a region adjacent the combustion bowl rim 33 toward the peak 32. The increased thickness (t) of the wall 28 over this region, which can be provided by one or more radially extending support members, also referred to as ribs 77, provides an increased strength to the wall 28 along the direction of the pin bore axis B. Otherwise, the diametrically opposite regions of the wall 28 spaced radially inwardly from the skirt panels 54 have a uniform or substantially uniform thickness (t), such as about 2 mm, for example, thereby resulting in reduced weight of the piston 12. It should be recognized that the increased thickness regions can be located where desired by forming ribs 77 in the appropriate locations of the top part 22.

Figure 8:
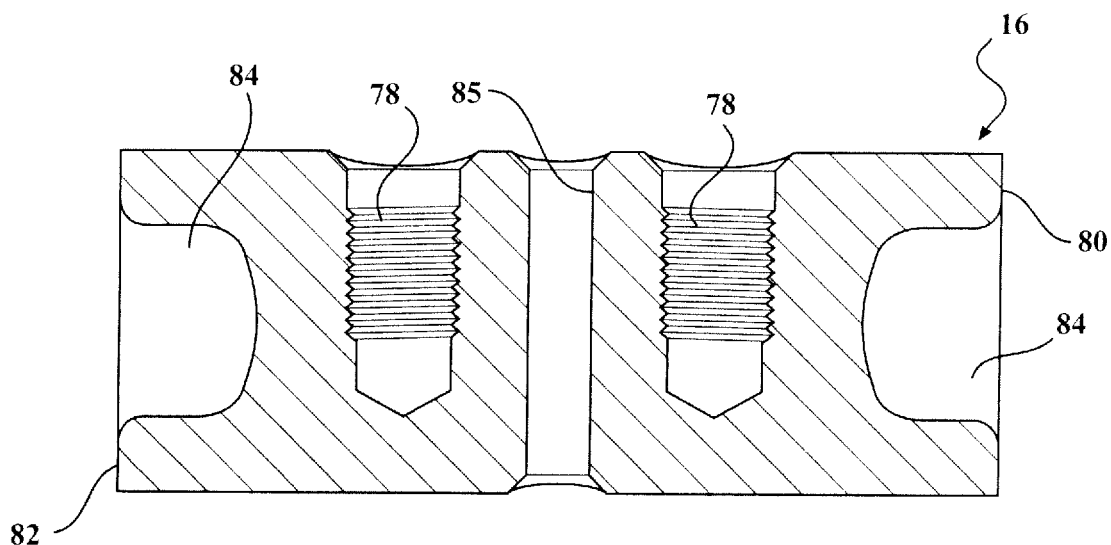
FIG. 8 is a cross-sectional side view of the wrist pin of the assembly of FIG. 1.

As shown in FIG. 8, the wrist pin 16 has at least one, and shown as a pair of threaded openings 78 for receipt of fasteners 79 to fix the connecting rod 14 to the wrist pin 16. Accordingly, the wrist pin 16 and the connecting rod 14 are fixed against relative movement with one another. The wrist pin 16 further includes opposite ends 80, 82 having recesses 84 extending therein, thus, further reducing the weight of the piston assembly 10 and moment of inertia thereof in use. Further contributing to a weight reduction is a through hole 85 extending between the threaded openings 78. The through hole 85 allows oil to flow therethrough, thus, enhancing cooling and lubrication of the wrist pin 16 in use. Further yet, with the full length of the wrist pin 16 bearing against the uppermost surface 57 of the pin bores 58 (extending into the floor 60 of the cooling gallery 76), the diameter of the wrist pin 16 can be substantially reduced, as the wrist pin is support over its full length and not in cantilevered fashion. Accordingly, the reduction in diameter of the wrist pin 16 further reduces the weight of the assembly 10, while at the same time being able to withstand increased firing pressures relative to conventional cantilevered wrist pin designs.

Figure 7:
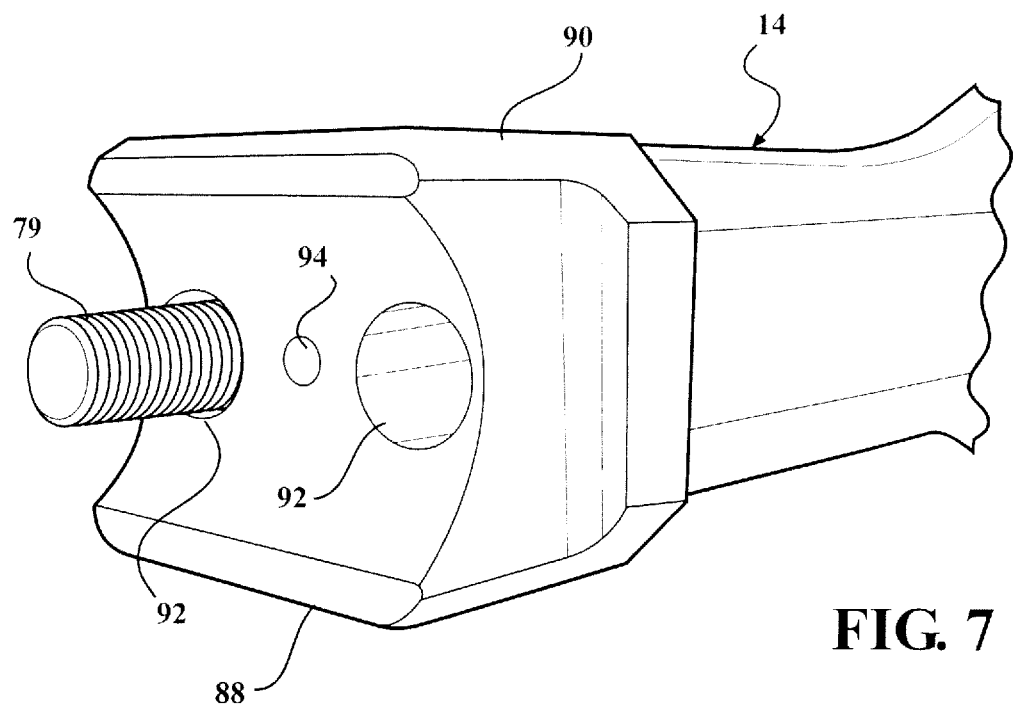
FIG. 7 is perspective view of the small end of the connecting rod of the assembly of FIG. 1.

The connecting rod 14 extends over a length (L, shown in FIG. 1) between a large end 86 with a bore 87 that is configured for coupling to a journal of a crankshaft (not shown) and an opposite end 88 that is configured for fixed attachment to the wrist pin 16. As shown in FIG. 7, the opposite end 88 has a symmetrical flange 90 with a pair of through openings 92 configured for alignment with the threaded openings 78 in the wrist pin 16. With the through openings 92 aligned with the threaded openings 78, the fasteners 79 are inserted through the through openings 92 and threaded into the threaded openings 78 to fix the connecting rod 14 to the wrist pin 16. The connecting rod 14 has an oil passage 94 extending over its length L from the bore 87 of the large end 86 through the flange 90 of the opposite end 88. The oil passage 94 is aligned with the through hole 84 in the wrist pin 16, and as such, allows oil to flow freely through the connecting rod 14 into the wrist pin 16 to facilitate removing heat generated in the region of the wrist pin 16 and the floor 60 of the piston 12, while also providing lubrication to the uppermost surface 57 of the pin bore 58, thereby eliminating any dry regions between the wrist pin 16 and the pin bearing surfaces.

The piston 10 is adapted for use in light, modern, high performance vehicle diesel engine applications. While made of steel, the piston 10, by its thin-walled design, and open cooling gallery 76, is as light, if not lighter, than its aluminum counterparts when taking into account the mass of the aluminum piston and the associated insert pin bore bushings, etc used in aluminum piston assemblies. The steel piston 10 also has a significantly smaller compression height CH, defined as the distance extending between the central pin bore axis B and the top wall 20, than its aluminum counterpart piston. The comparable weight and smaller CH allows the engine to be made smaller and more compact. The greatly reduced CH is made possible by synergistic features, including the reduced diameter wrist pin 16, the raised location of the saddle-shaped uppermost wrist pin bearing surface 57 against which the wrist pin 16 oscillates, the relatively low profile configuration of the cooling gallery 76 and the fixation of the connecting rod end 88 directly to the wrist pin 16. With the CH being substantially reduced, the piston skirt panels 54 are able to be made having reduced surface areas, and thus, the friction resulting between the skirt panels 54 and the cylinder liner is reduced, further contributing to a reduction in vibration, side thrust loading and cavitation within the cylinder liner cavitation. Further contributing to the reduced friction and reduced side thrust loading is the elimination of bushings in favor of advanced tribological coatings, such as, by way of example and without limitation, a thin layer (e.g. 3-12 µm) of electroplated chromium-based material with nanodiamonds; other diamond-like coatings or manganese phosphate. The coating can be applied to the uppermost saddle-shaped wrist pin bearing surface 57 and/or the upper bearing surface of the wrist pin 16. If applied to the wrist pin 16, the wrist pin can act as the sole tribological element, thereby improving manufacturing efficiencies and reducing cost. The reduction in friction also contributes to a reduced brake specific fuel consumption (BSFC-G/KWH) via increased thermodynamic efficiency of the diesel cycle and lower rubbing friction losses.

As a result of the reduced CH and overall envelop of the piston 12, the length L of the connecting rod 14 can be extended by the same or about the same length as the reduction in CH. However, if desired, the same center-to-center relation of a standard connecting rod can be attained by reducing the crank-to-deck face height, thereby reducing the engine block weight and envelop of the engine. Otherwise, the length L of the connecting rod 14 can be extended, which in turn, results in a reduced angularity of oscillation over a full stroke, and thus, reduces the thrust load imparted on the skirt panels 54. This also results in a reduction of impact losses stemming from the translation of the piston from one side of the liner to the other, thereby reducing liner cavitation. Further, with the length L being increased, an increase in thermal efficiency is attained due to the added residence time per crank angle spent by the piston 12 close to top-dead-center (TDC) during combustion, thereby increasing the efficiency of conversion into brake power.

Figure 9:
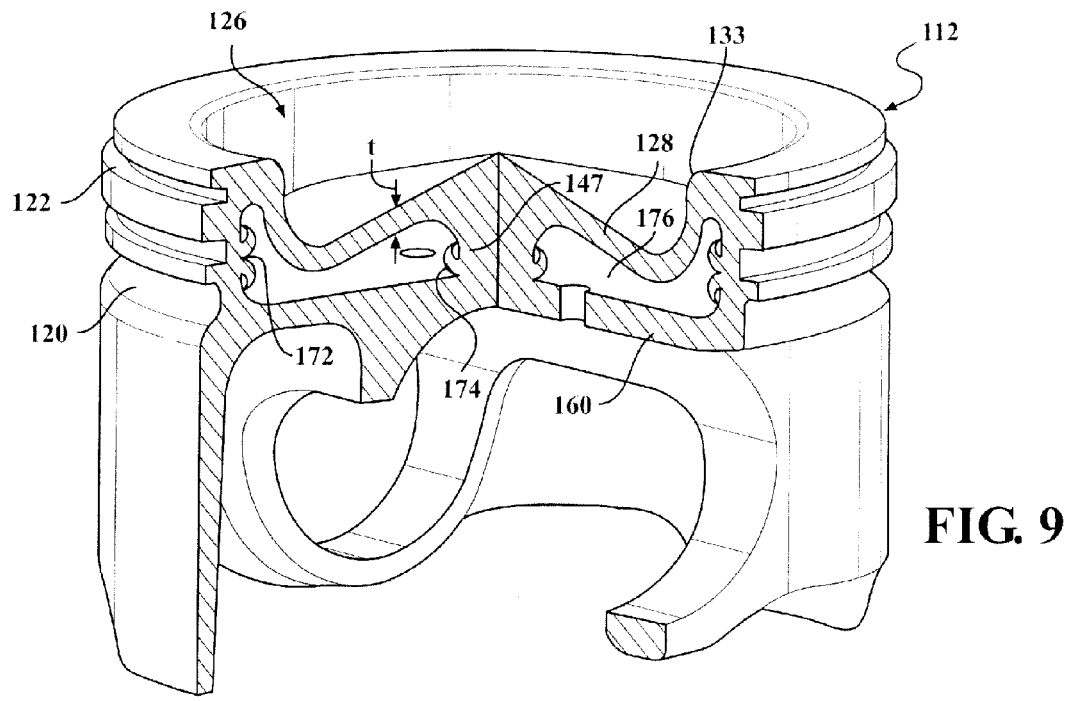
FIG. 9 is a partially sectioned perspective view of a piston constructed in accordance with another aspect of the invention.

In FIG. 9, a piston 112 constructed in accordance with another aspect of the invention is shown, wherein the same reference numerals as used above are used, offset by a factor of 100, to identify like features.

The piston 112 has a bottom part 120 fixed to a top part 122, shown as being friction welded, by way of example and without limitation. The bottom part 120 and top part 122 are joined via first and second weld joints 172, 174, as discussed above with regard to the piston 12. The notable difference with the piston 112 is that the top part 122 has a combustion bowl wall 128 with a uniform thickness (t) extending between a central support member or pillar 147 and a rim 133 of a combustion bowl 126, without having thickened rib regions. As such, a cooling gallery 176 having a symmetrical, annularly uniform shape is formed between the combustion bowl wall 128 and a floor 160 of the bottom part 120. Otherwise, the piston 112 is the same as discussed above with regard to the piston 10 of FIG. 1.

Figure 10:
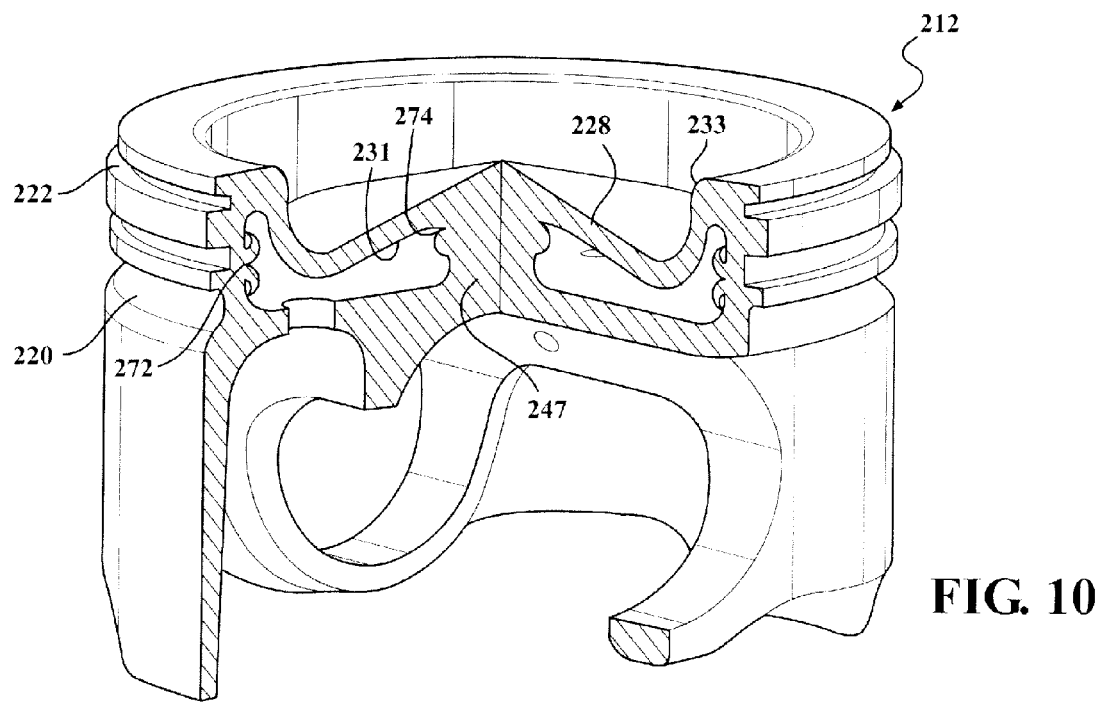
FIG. 10 is a partially sectioned perspective view of a piston constructed in accordance with yet another aspect of the invention.
Figure 10A:
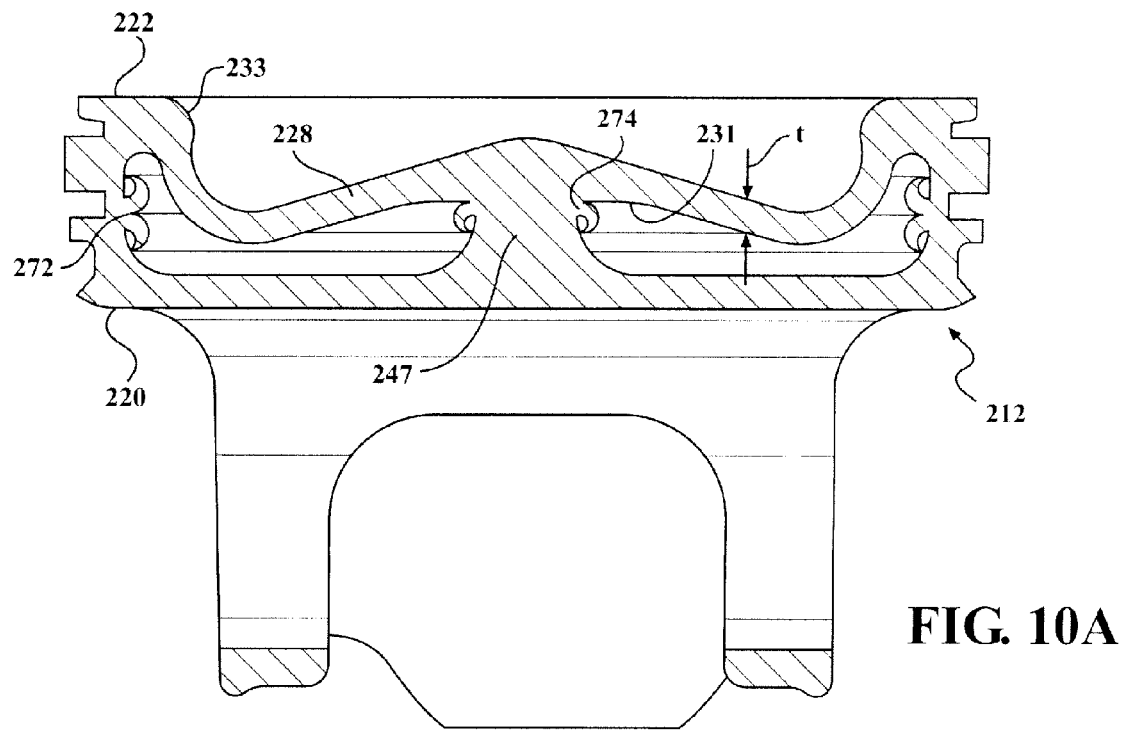
FIG. 10A is a cross-sectional side view taken generally along a pin bore axis of the piston of FIG. 10.

In FIGS. 10 and 10A, a piston 212 constructed in accordance with another aspect of the invention is shown, wherein the same reference numerals as used above are used, offset by a factor of 200, to identify like features.

The piston 212 has a bottom part 220 fixed to a top part 222, shown as being friction welded, by way of example and without limitation. The bottom part 220 and top part 222 are joined via first and second weld joints 272, 274, wherein the first weld joint is formed as discussed above with regard to the pistons 12, 112. Further, the piston 212 is shown having a combustion wall 228 with a uniform thickness (t) extending between a central pillar 247 and a rim 233 of a combustion bowl 226, without having thickened rib regions. However, the notable difference with the piston 212 is that the pillar 247 is shown as being formed as a monolithic piece of material with the bottom part 220, such that the second weld joint 274 is formed between a free end of the pillar 247 and a lower surface 231 of the combustion bowl wall 228. Otherwise, the piston 212 is the same as discussed above with regard to the piston 110 of FIG. 9.

Figure 11:
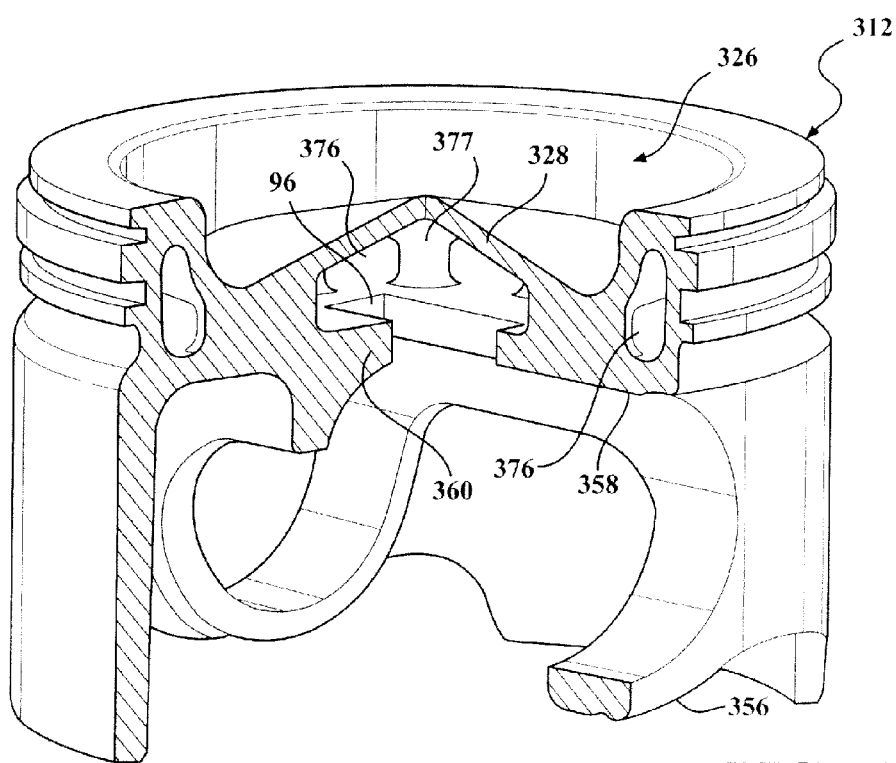
FIG. 11 is a partially sectioned perspective view of a piston constructed in accordance with yet another aspect of the invention.
Figure 11A:
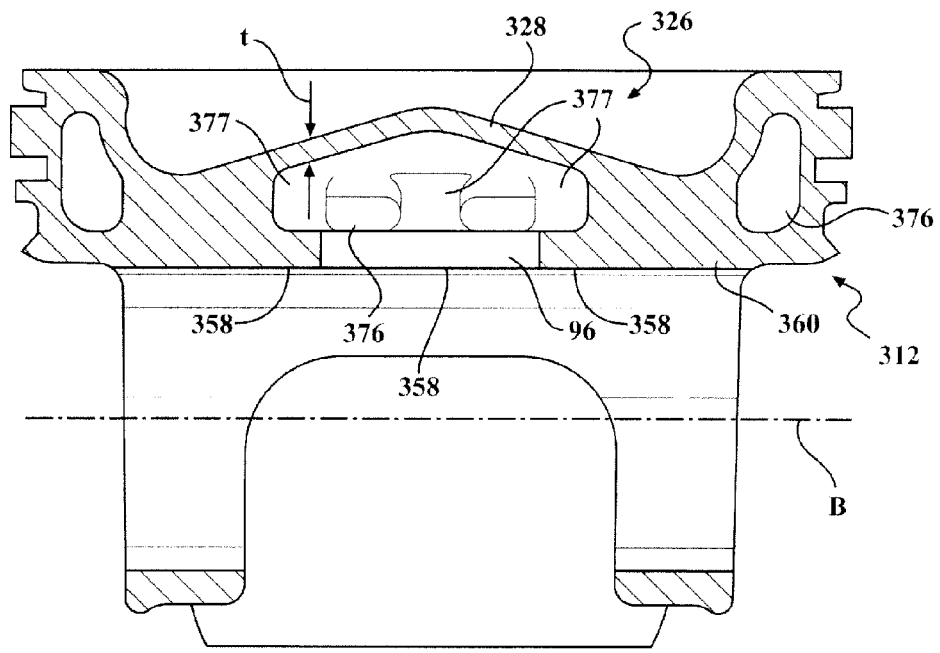
FIG. 11A is a cross-sectional side view taken generally along a pin bore axis of the piston of FIG. 11.
Figure 11B:
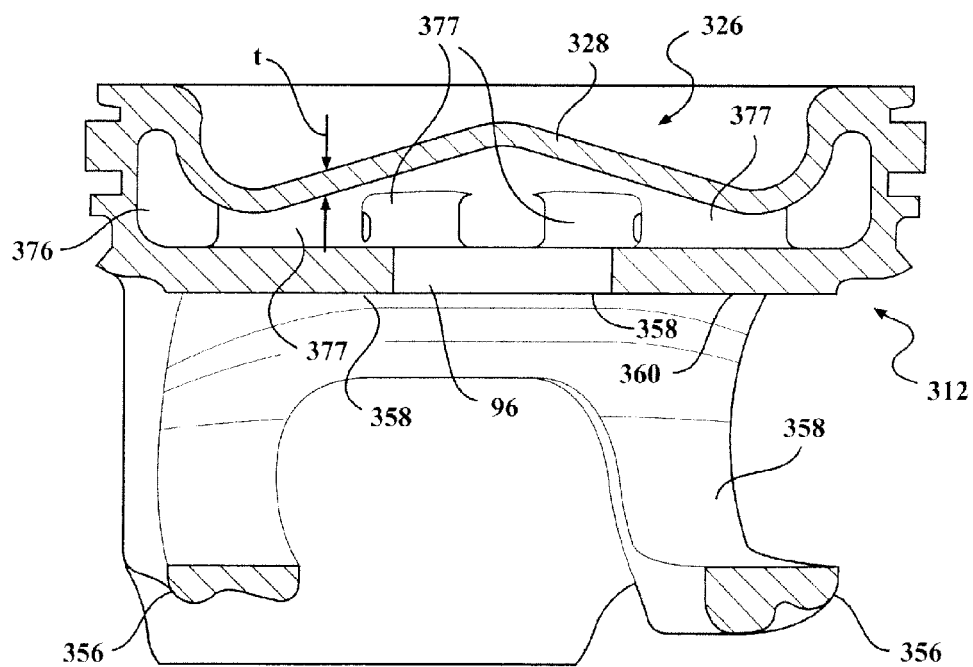
FIG. 11B is a cross-sectional perspective view taken in oblique relation to the pin bore axis of the piston of FIG. 11.
Figure 11C:
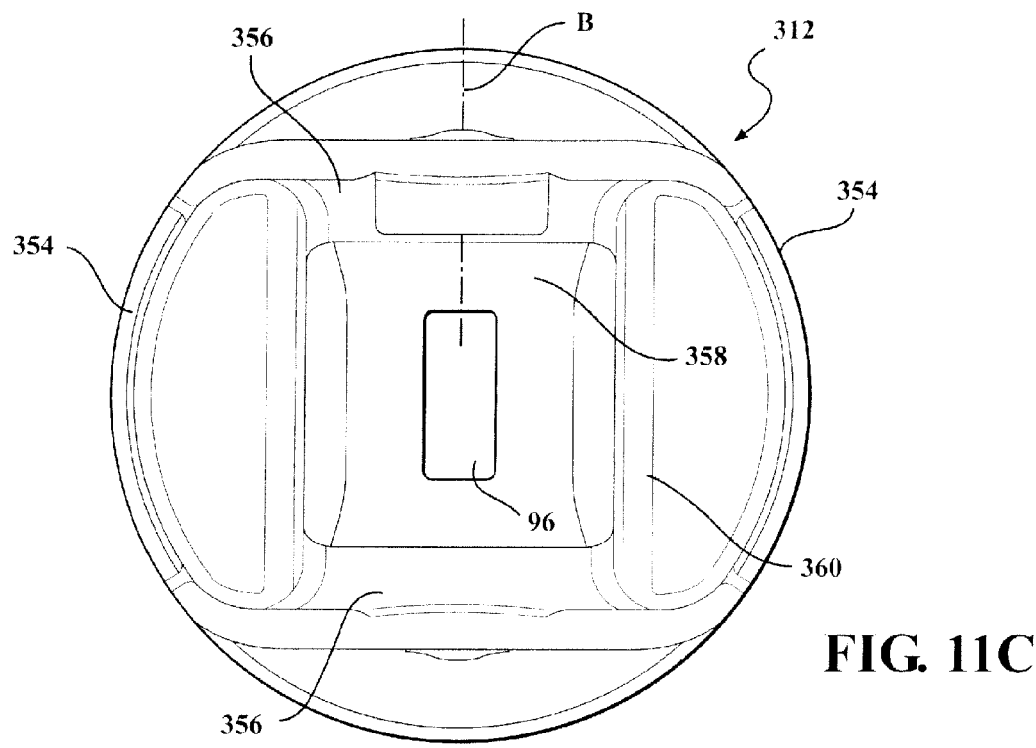
FIG. 11C is a bottom view of the piston of FIG. 11.

In FIGS. 11-11C, a piston 312 constructed in accordance with another aspect of the invention is shown, wherein the same reference numerals as used above are used, offset by a factor of 300, to identify like features.

The piston 312, rather than being constructed by fixing separately constructed bottom and top parts to one another, is constructed as a monolithic piece of material, such as in a casting operation. To facilitate casting the piston 312, a floor 360 delimiting a lower surface of a cooling gallery 376 has an opening 96 shown as being centrally located in the floor 360. The opening 96, as best seen in FIG. 11C, is, by way of example and without limitation, generally rectangular, with the length of the opening 96 extending generally centrally along the pin bore axis B. The piston 312 includes essentially all of the components detailed for the piston 12, with the exception of a central pillar. Accordingly, the piston 312 has a combustion bowl 326 with a combustion bowl wall 328 having a constant or substantially constant thickness (t), with radially extending support members or ribs 377 extending between the combustion bowl wall 328 and the floor 360 for added strength. Further, the piston 312 includes skirt panels 354; pin bosses 356; and pin bores 358 with an uppermost wrist pin bearing surface 357 extending within and between the pin bores 358.

Figure 11D:
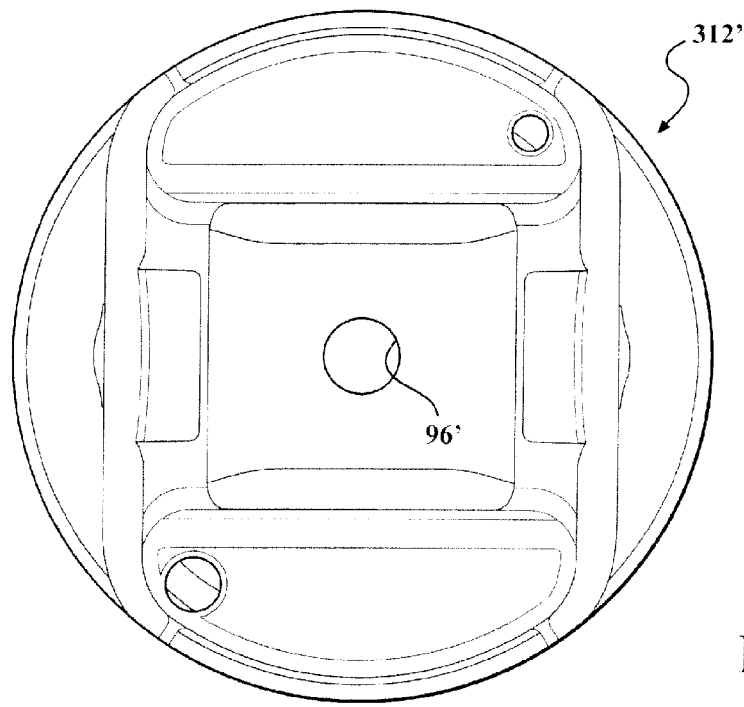
FIG. 11D is a view similar to FIG. 11C showing an alternate embodiment of the piston of FIG. 11.

In FIG. 11D, a piston 312' constructed in accordance with another aspect of the invention is shown, wherein the same reference numerals as used above are used, offset by a factor of 300', to identify like features.

The piston 312' is similar to the piston 312 of FIGS. 11-11C, however, rather than having an enlarged rectangular opening in a floor 360', the piston 312' has a reduced size, round opening 96', thereby increasing the surface area of the uppermost wrist pin bearing surface 357'.

Figure 12:
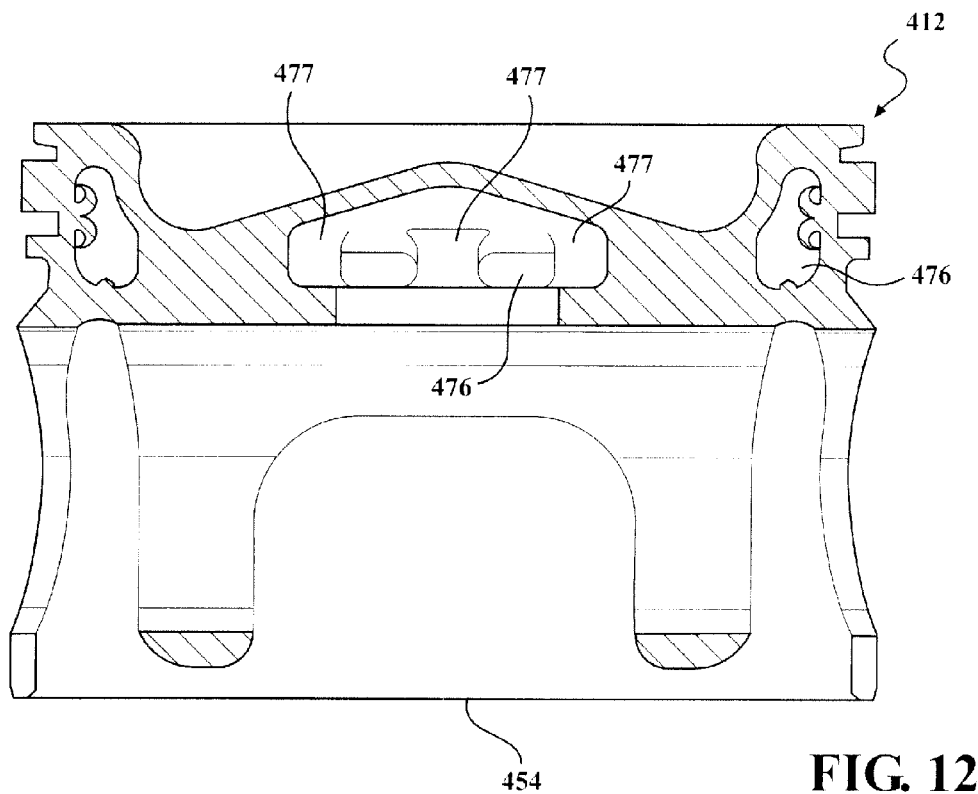
FIG. 12 is a cross-sectional view taken generally along a pin bore axis of a piston constructed in accordance with yet another aspect of the invention.

In FIG. 12, a piston 412 constructed in accordance with another aspect of the invention is shown, wherein the same reference numerals as used above are used, offset by a factor of 400, to identify like features.

Figure 12A:
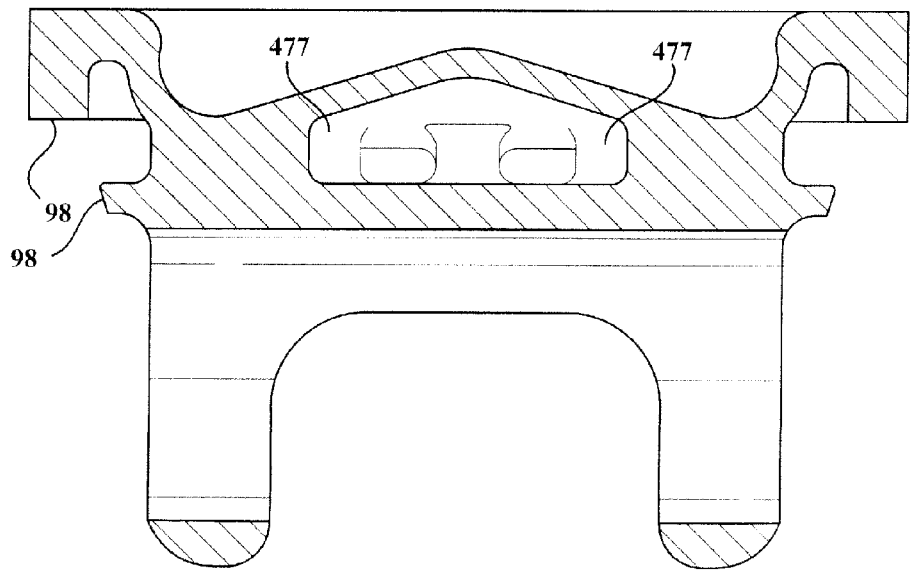
FIG. 12B is a cross-sectional view taken generally along a central axis of a bottom part of the piston of FIG. 12.
FIG. 12C is a cross-sectional view taken generally along a pin bore axis of the piston of FIG. 12 after fixing the top part to the bottom part and prior to forming openings in the bottom part along the pin bore axis.
Figure 12B:
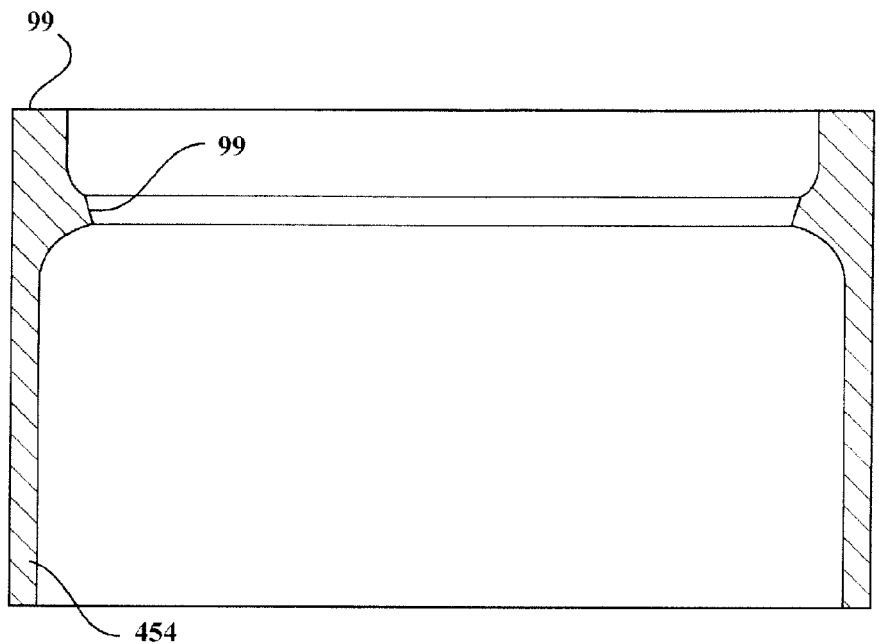
Figure 12C:
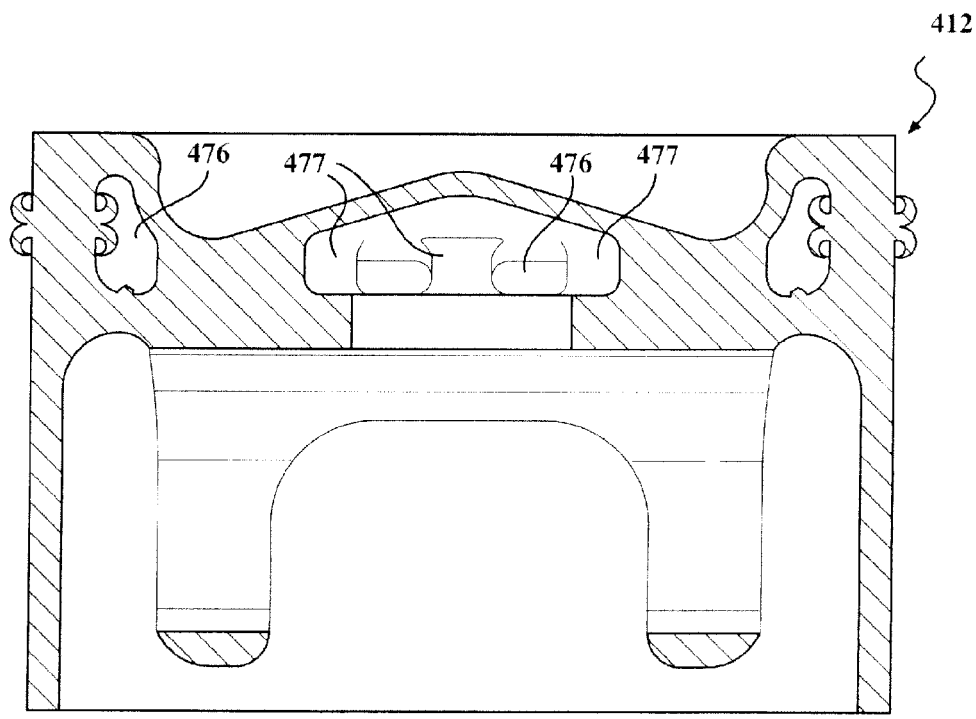

The piston 412 is similar to the piston 312 of FIG. 11, however, rather than being cast as a single part, the piston 412 has skirt panels 454 welded to the remaining cast crown portion of the piston 412, such as in a friction weld operation, by way of example and without limitation. As shown in FIG. 12A, the crown portion of the piston 412 is constructed having generally the same features illustrated and discussed with regard to the piston 312, including an open, toroid shaped cooling gallery 476 with radially extending support members or ribs 477. Further, the crown portion is shown having a pair of annular weld surfaces 98 (FIG. 12A). Then, as shown in FIG. 12B, the skirt panels 454 are initially provided as a cylindrical member having a pair of annular weld surfaces 99 configured to mate with the weld surfaces 98 of the crown portion. FIG. 12 C shows the crown portion and skirt panels 454 as initially welded to one another, prior to machining away portions of the skirt panels 454, while FIG. 12 illustrates the finished piston 412.

Figure 13:
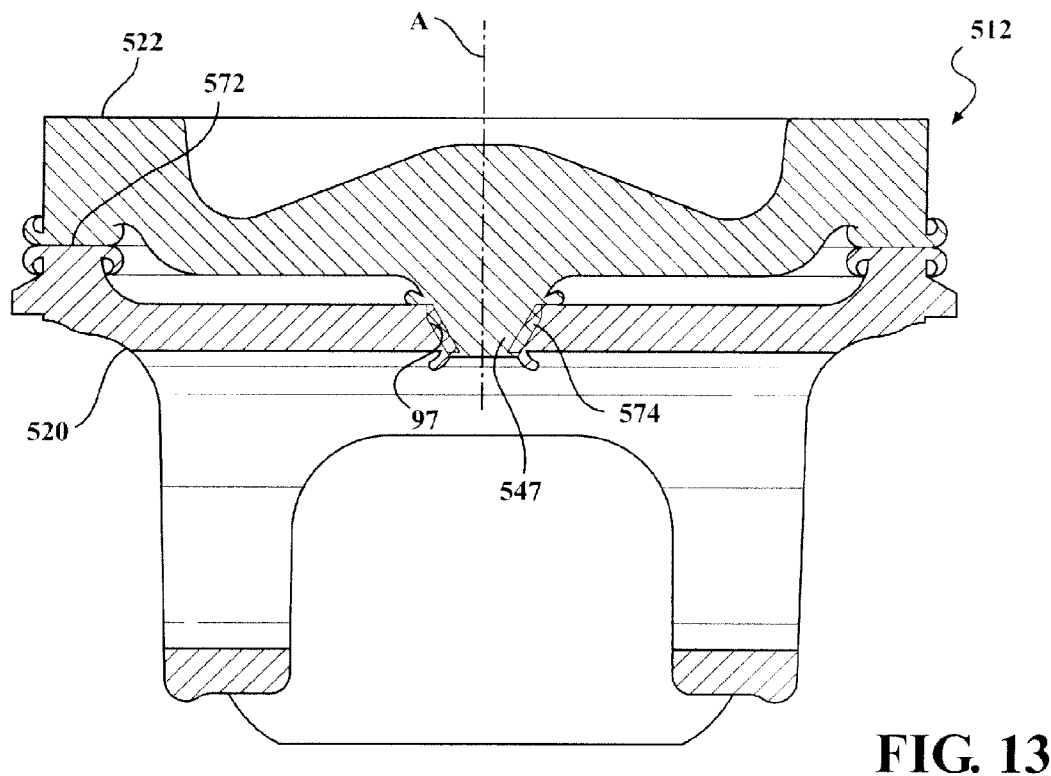
FIG. 13 is a cross-sectional view taken generally along a pin bore axis of a piston similar to the piston of FIG. 4 showing an alternate mechanism for fixing a top part to a bottom part of the piston.
Figure 13A:
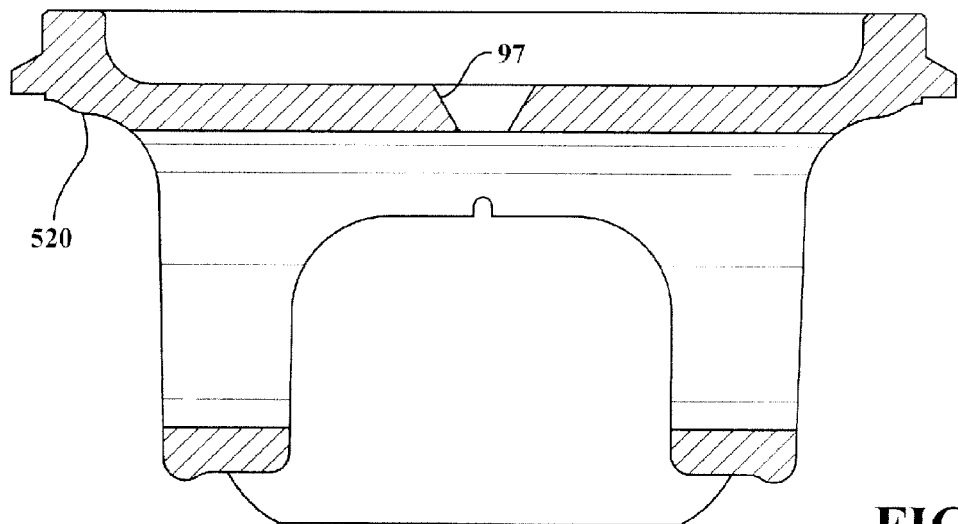
FIG. 13A is a cross-sectional view taken generally along a pin bore axis of the bottom part of the piston of FIG. 13.
Figure 13B:
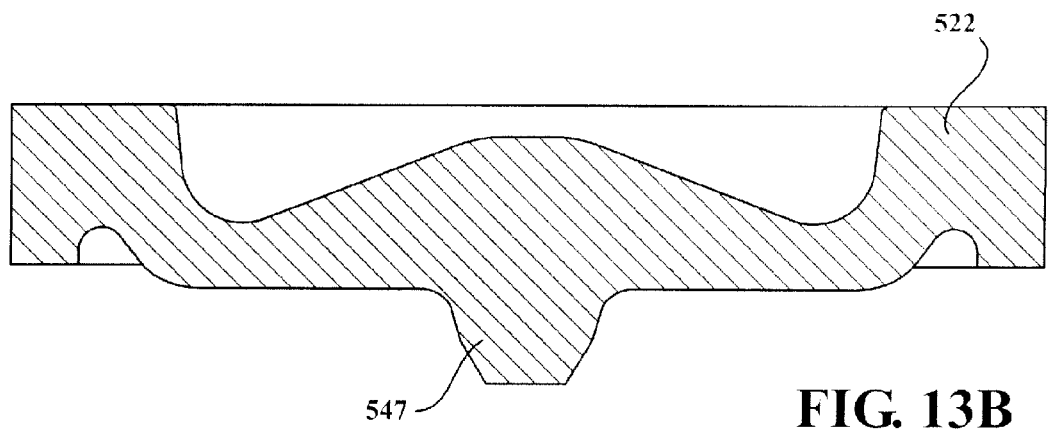
FIG. 13B is a cross-sectional view taken generally along a pin bore axis of the top part of the piston of FIG. 13.

In FIG. 13, a piston 512 constructed in accordance with another aspect of the invention is shown, wherein the same reference numerals as used above are used, offset by a factor of 500, to identify like features.

The piston 512 is constructed similarly to the piston 12, including having a first weld joint 572 and a second weld joint 574 fixing a bottom part 520 to a top part 522. The first weld joint 572 is similar to the weld joint 72 of the piston 12, however, the second weld joint 574 is different. Rather than friction welding a support member or pillar 547 to a flat surface of a floor 560 of the bottom part 520, as with the piston 12, the pillar 547 is centered and welded within a recess or opening 97 formed in the floor 560 of the bottom part 520 along a central longitudinal axis A of the piston 512. The opening 97 is shown as a through opening having a conical wall configured to mate with a conical surface of the pillar 547. Accordingly, the weld joint 574 is formed having a frustroconical shape. Otherwise, the piston 512 is the same as the piston 12 of FIG. 1.

Figure 14:
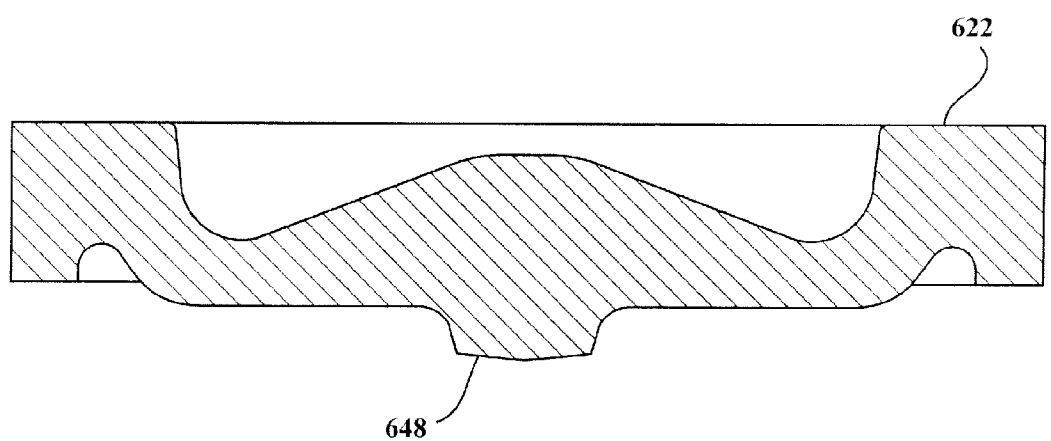
FIG. 14 is a cross-sectional view of a top part constructed in accordance with another aspect of the invention.

In FIG. 14, a top part 622 constructed in accordance with another aspect of the invention is shown, wherein the same reference numerals as used above are used, offset by a factor of 600, to identify like features.

The top part 622 is similar as represented for the piston 12, however, the central support member or pillar 647 of the top part 622 has a tapered end providing the second upper joining surface 648. The tapered end facilitates forming a reliable weld joint with the bottom part by providing increased pressure between the surfaces being welded, thereby causing increased heat and improved melting of the material during the welding process, and further, can be brought into contact with the lower part in advance of radially outward bonding surfaces, thereby allowing the central pillar 647, which rotates at a slower relative velocity than the radially outer surfaces, to begin melting in advance of the radially outward surfaces.

Obviously, many modifications and variations of the present invention are possible in light of the above teachings. It should be recognized that some of the features discussed above for the separate embodiments can be used in other embodiments. It is, therefore, to be understood that within the scope of the appended claims, the invention may be practiced otherwise than as specifically described.

What is claimed is:

1. A piston assembly for an internal combustion engine, comprising:
a piston head having an upper combustion wall with an undercrown surface and a ring belt region depending from said upper combustion wall, a floor having an upper surface and a bottom surface, said floor being spaced beneath said upper combustion wall in radial alignment with said ring belt region, a substantially enclosed, annular cooling gallery bounded by said undercrown surface and said floor, said cooling gallery extending radially inwardly from said ring belt region;
a pair of pin bores depending directly from the floor of the cooling gallery;
a pin having ends configured for oscillating receipt in the pin bores;
a pin bearing surface extending within said pin bores and between said pin bores in said lower surface of said floor; and
a connecting rod having an end fixed to the pin for conjoint oscillation therewith.

2. The piston assembly of claim 1 further comprising at least one support extending between the undercrown surface and said upper surface of said floor.

3. The piston assembly of claim 2 wherein said at least one support member extends coaxially along a central longitudinal axis of said piston head.

4. The piston assembly of claim 2 wherein said at least one support member includes a plurality of support members extending radially outwardly from a central longitudinal axis of said piston head.

5. The piston assembly of claim 4 further including an opening extending through said floor, said opening being centrally located along a central longitudinal axis of said piston head.

6. The piston assembly of claim 1 wherein said piston head includes a top part and a bottom part, said top part having an annular first upper joining surface depending from said upper combustion surface and a second joining surface depending from said upper combustion surface along a central longitudinal axis of the piston, said bottom part including an annular lower joining surface extending upwardly from said floor, said lower joining surface being bonded to said first upper joining surface at a first bond joint and an upper surface of said floor being bonded to said second joining surface at a second bond joint.

7. The piston assembly of claim 1 further including an inlet lubrication feed port extending into said cooling gallery and an outlet lubrication feed port extending out of said cooling gallery in tangential relation with said pin.

8. The piston assembly of claim 1 wherein said pin has a through hole and said connecting rod has an oil passage aligned with said through hole for oil flow through said connecting rod into said pin and into contact with said pin bearing surface.

9. The piston assembly of claim 8 wherein said pin has a diameter and said through hole extends through and along said diameter of said pin.

10. The piston assembly of claim 9 wherein said connecting rod has a length and said oil passage extends along said length of said connecting rod.

11. The piston assembly of claim 1 wherein said cooling gallery is closed.

12. The piston assembly of claim 11 wherein said cooling gallery contains a coolant.

13. The piston assembly of claim 12 wherein said coolant is a high thermal conductivity metal-containing composition.

14. A piston for an internal combustion engine, comprising:
 a piston head having an upper combustion wall with an undercrown surface and a ring belt region depending from said upper combustion wall, a floor having an upper surface and a bottom surface, said floor being spaced beneath said upper combustion wall in radial alignment with said ring belt region, a substantially enclosed, annular cooling gallery bounded by said undercrown surface and said floor, said cooling gallery extending radially inwardly from said ring belt region;
 a pair of pin bores depending directly from the floor of the cooling gallery; and
 a pin bearing surface extending within said pin bores and between said pin bores on said lower surface of said floor.

15. The piston of claim 14 further comprising at least one support extending between the undercrown surface and said upper surface of said floor.

16. The piston of claim 15 wherein said at least one support member extends coaxially along a central longitudinal axis of said piston head.

17. The piston of claim 15 wherein said at least one support member includes a plurality of support members extending radially outwardly from a central longitudinal axis of said piston head.

18. The piston of claim 17 further including an opening extending through said floor, said opening being centrally located along a central longitudinal axis of said piston head.

19. The piston of claim 14 wherein said piston head includes a top part and a bottom part, said top part having an annular first upper joining surface depending from said upper combustion surface and a second joining surface depending from said upper combustion surface along a central longitudinal axis of the piston, said bottom part including an annular lower joining surface extending upwardly from said floor, said lower joining surface being bonded to said first upper joining surface at a first bond joint and an upper surface of said floor being bonded to said second joining surface at a second bond joint.

20. The piston of claim 14 wherein said cooling gallery is closed.

21. The piston of claim 20 wherein said cooling gallery contains a coolant.

22. The piston of claim 21 wherein said coolant is a high thermal conductivity metal-containing composition.

* * * * *